(12) United States Patent
Zhou et al.

(10) Patent No.: US 12,181,637 B2
(45) Date of Patent: Dec. 31, 2024

(54) OPTICAL IMAGING LENS ASSEMBLY

(71) Applicant: ZHEJIANG SUNNY OPTICS CO., LTD., Zhejiang (CN)

(72) Inventors: Yu Zhou, Zhejiang (CN); Yu Tang, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 612 days.

(21) Appl. No.: 17/505,669

(22) Filed: Oct. 20, 2021

(65) Prior Publication Data
US 2022/0146793 A1 May 12, 2022

(30) Foreign Application Priority Data
Nov. 6, 2020 (CN) .......................... 202011227741.5

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .... G02B 13/0045; G02B 13/18; G02B 13/04; G02B 9/64
See application file for complete search history.

(56) References Cited

U.S. PATENT DOCUMENTS

| | | | | |
|---|---|---|---|---|
| 2020/0209594 A1* | 7/2020 | Hirano | ............... | G02B 13/0045 |
| 2021/0278636 A1* | 9/2021 | Lin | ......................... | G02B 13/04 |
| 2022/0075149 A1* | 3/2022 | Chen | ...................... | G02B 13/18 |
| 2022/0171162 A1* | 6/2022 | Jang | .................... | G02B 13/0045 |
| 2022/0196975 A1* | 6/2022 | Lin | ..................... | G02B 27/0025 |

OTHER PUBLICATIONS

Gross et al. "Handbook of Optical Systems Volume 3: Aberration Theory and Correction of Optical Systems" Weinheim Germany, Wiley-VCH Verlag Gmbh & Co. KGaA, pp. 377-379 (Year: 2007).*

* cited by examiner

*Primary Examiner* — Cara E Rakowski
(74) *Attorney, Agent, or Firm* — Samson G. Yu

(57) ABSTRACT

The disclosure discloses an optical imaging lens assembly, which sequentially includes, from an object side to an image side along an optical axis, a first lens, a second lens, a third lens, a fourth lens, a fifth lens, a sixth lens, a seventh lens, an eighth lens and a ninth lens with refractive power respectively. There is an air space between any two adjacent lenses. The third lens has positive refractive power. An object-side surface of the fourth lens is a concave surface, while an image-side surface is a concave surface. ImgH is a half of a diagonal length of an effective pixel region on an imaging surface, T89 is a spacing distance of the eighth lens and the ninth lens on the optical axis, ImgH and T89 meet 6.0<ImgH/T89<7.0.

14 Claims, 15 Drawing Sheets

OPTICAL IMAGING LENS ASSEMBLY

CROSS-REFERENCE TO RELATED APPLICATION(S)

The present invention claims priority to Chinese Patent Application No. 202011227741.5, filed on Nov. 6, 2020 and entitled "Optical imaging lens assembly", the contents of which are hereby incorporated by reference in its entirety.

TECHNICAL FIELD

The disclosure relates to the field of optical elements, and more particularly to an optical imaging lens assembly.

BACKGROUND

In recent years, with the rapid development of smart phones, pixels of mobile phone cameras arranged in smart phones have also been constantly upgraded, and particularly, requirements on rear main cameras of mobile phones have increased. Pixels of mobile phone cameras have been rapidly improved from more than a hundred thousand in the past to tens of millions and even hundreds of millions based on high-pixel requirements of mobile phone suppliers. In the future development of mobile phone cameras, pixels of mobile phone cameras will continue to be improved, and resolutions of the mobile phone cameras will be improved therewith. That is, high pixel will become a main development trend of the industry in the field of mobile phone cameras in the future.

In order to meet application requirements of main cameras in high-end smart phones better, it is expected to provide an optical imaging lens assembly with a large image surface.

SUMMARY

The disclosure provides an optical imaging lens assembly, which sequentially includes, from an object side to an image side along an optical axis, a first lens, a second lens, a third lens, a fourth lens, a fifth lens, a sixth lens, a seventh lens, an eighth lens and a ninth lens with refractive power respectively. There is an air space between any two adjacent lenses. The third lens has positive refractive power. An object-side surface of the fourth lens is a concave surface, while an image-side surface is a concave surface. ImgH is a half of a diagonal length of an effective pixel region on an imaging surface, T89 is a spacing distance of the eighth lens and the ninth lens on the optical axis, ImgH and T89 may meet $6.0<ImgH/T89<7.0$. A maximum image surface height of the optical imaging lens assembly and an air space between the eighth lens and the ninth lens on the optical axis are restricted, so that the optical imaging lens assembly has an imaging effect of large image surface and is relatively high in machinability.

In an implementation mode, f2 is an effective focal length of the second lens, f3 is an effective focal length of the third lens, f2 and f3 may meet $-3.0<f3/f2<-2.0$.

In an implementation mode, f1 is an effective focal length of the first lens, f5 is an effective focal length of the fifth lens, f1 and f5 may meet $3.5<f5/f1<7.0$.

In an implementation mode, f is an effective focal length of the optical imaging lens assembly, f8 is an effective focal length of the eighth lens, f9 is an effective focal length of the ninth lens, f, f8 and f9 may meet $1.0<f/(f8+f9)<1.5$.

In an implementation mode, TTL is an on-axis distance from an object-side surface of the first lens to the imaging surface, Fno is an f-number of the optical imaging lens assembly, TTL and Fno may meet $4.5\ mm<TTL/Fno<5.0\ mm$.

In an implementation mode, CT1 is a center thickness of the first lens on the optical axis, CT8 is a center thickness of the eighth lens on the optical axis, CT1 and CT8 may meet $1.0<CT8/CT1<1.5$.

In an implementation mode, Semi-FOV is a half of a maximum field of view of the optical imaging lens assembly, CT9 is a center thickness of the ninth lens on the optical axis, Semi-FOV and CT9 may meet $1.0<Tan(Semi-FOV)/CT9<1.5$.

In an implementation mode, T12 is an air space of the first lens and the second lens on the optical axis, T23 is an air space of the second lens and the third lens on the optical axis, T34 is an air space of the third lens and the fourth lens on the optical axis, T12 and T23 and T34 may meet $(T12+T23)<T34$.

In an implementation mode, R1 is a curvature radius of an object-side surface of the first lens, R2 is a curvature radius of an image-side surface of the first lens, N1 is a refractive index of the first lens, R1 and R2 and N1 may meet $R1*N1/R2<0.5$.

In an implementation mode, R4 is a curvature radius of an image-side surface of the second lens, N2 is a refractive index of the second lens, R4 and N2 may meet $2.5<R4/N2<3.5$.

In an implementation mode, V2 is an Abbe number of the second lens, R3 is a curvature radius of an object-side surface of the second lens, V2 and R3 may meet $2.0<V2/R3<2.5$.

In an implementation mode, f3 is an effective focal length of the third lens, R6 is a curvature radius of an image-side surface of the third lens, f3 and R6 may meet $2.5<f3/R6<4.0$.

In an implementation mode, R14 is a curvature radius of an image-side surface of the seventh lens, V7 is an Abbe number of the seventh lens, R14 and V7 may meet $-2.5<R14/V7<0$.

Another aspect of the disclosure provides an optical imaging lens assembly, which sequentially includes, from an object side to an image side along an optical axis, a first lens, a second lens, a third lens, a fourth lens, a fifth lens, a sixth lens, a seventh lens, an eighth lens and a ninth lens with refractive power. There is an air space between any two adjacent lenses. The third lens has positive refractive power. An object-side surface of the fourth lens is a concave surface, while an image-side surface is a concave surface. f2 is an effective focal length of the second lens, f3 is an effective focal length of the third lens, f2 and f3 may meet $-3.0<f3/f2<-2.0$. A ratio of refractive power of the third lens to refractive power of the second lens is reasonably controlled in this range, so that the optical sensitivity of the third lens and the optical sensitivity of the second lens may be reduced effectively to further help to implement the batch production of the second lens and the third lens.

In an implementation mode, f1 is an effective focal length of the first lens, f5 is an effective focal length of the fifth lens, f1 and f5 may meet $3.5<f5/f1<7.0$.

In an implementation mode, ImgH is a half of a diagonal length of an effective pixel region on an imaging surface, T89 is a spacing distance of the eighth lens and the ninth lens on the optical axis, ImgH and T89 may meet $6.0<ImgH/T89<7.0$.

In an implementation mode, f is a total effective focal length of the optical imaging lens assembly, f8 is an effective focal length of the eighth lens, f9 is an effective focal length of the ninth lens, f and f8 and f9 may meet $1.0<f/(f8+f9)<1.5$.

In an implementation mode, TTL is an on-axis distance from an object-side surface of the first lens to an imaging surface, Fno is an f-number of the optical imaging lens assembly, TTL and Fno may meet $4.5\text{ mm}<TTL/Fno<5.0\text{ mm}$.

In an implementation mode, CT1 is a center thickness of the first lens on the optical axis, CT8 is a center thickness of the eighth lens on the optical axis, CT1 and CT8 may meet $1.0<CT8/CT1<1.5$.

In an implementation mode, Semi-FOV is a half of a maximum field of view of the optical imaging lens assembly, CT9 is a center thickness of the ninth lens on the optical axis, Semi-FOV and CT9 may meet $1.0<\text{Tan}(\text{Semi-FOV})/CT9<1.5$.

In an implementation mode, T12 is a spacing distance of the first lens and the second lens on the optical axis, T23 is a spacing distance of the second lens and the third lens on the optical axis, T34 is a spacing distance of the third lens and the fourth lens on the optical axis, T12 and T23 and T34 may meet $(T12+T23)<T34$.

In an implementation mode, R1 is a curvature radius of an object-side surface of the first lens, R2 is a curvature radius of an image-side surface of the first lens, N1 is a refractive index of the first lens, R1 and R2 and N1 may meet $R1\times N1/R2<0.5$.

In an implementation mode, R4 is a curvature radius of an image-side surface of the second lens, N2 is a refractive index of the second lens, R4 and N2 may meet $2.5<R4/N2<3.5$.

In an implementation mode, V2 is an Abbe number of the second lens, R3 is a curvature radius of an object-side surface of the second lens, V2 and R3 may meet $2.0<V2/R3<2.5$.

In an implementation mode, f3 is the effective focal length of the third lens, R6 is a curvature radius of an image-side surface of the third lens, f3 and R6 may meet $2.5<f3/R6<4.0$.

In an implementation mode, R14 is a curvature radius of an image-side surface of the seventh lens, V7 is an Abbe number of the seventh lens, R14 and V7 may meet $-2.5<R14/V7<0$.

According to the disclosure, nine lenses are adopted, the refractive power and surface types of each lens, the center thickness of each lens, the on-axis distances between the lenses and the like are configured reasonably, so that the optical imaging lens assembly has an imaging effect of large image surface and is relatively high in machinability, higher imaging quality is achieved, meanwhile, batch production is facilitated, and the machining and assembling stability may be ensured.

BRIEF DESCRIPTION OF THE DRAWINGS

Detailed descriptions are made to unrestrictive implementation modes below in combination with the drawings to make the other characteristics, purposes and advantages of the disclosure more apparent. In the drawings.

DETAILED DESCRIPTION OF THE EMBODIMENTS

Figure 1:
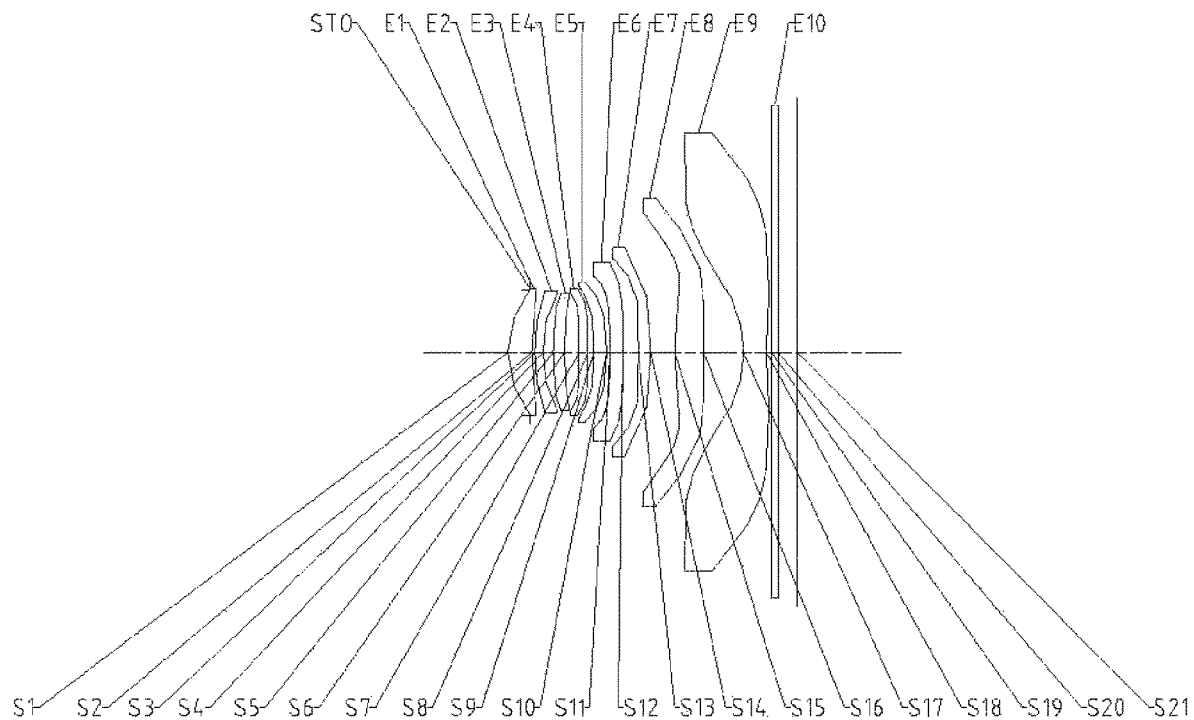
FIG. 1 shows a structure diagram of an optical imaging lens group according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, and the like are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspherical shape shown in the drawings is shown by some embodiments. That is, the spherical shape or the aspheric shape is not limited to the spherical shape or aspheric shape shown in the drawings. The drawings are by way of example only and not strictly to scale.

Herein, a surface, closest to a shot object, of each lens is called an object-side surface of the lens, and a surface, closest to an imaging surface, of each lens is called an image-side surface of the lens.

It should also be understood that terms "include", "including", "have", "contain", and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles, and other aspects of the disclosure will be described below in detail.

An optical imaging lens assembly according to an exemplary implementation mode of the disclosure may include, for example, nine lenses with refractive power, i.e., a first lens, a second lens, a third lens, a fourth lens, a fifth lens, a sixth lens, a seventh lens, an eighth lens, and a ninth lens. The nine lenses are sequentially arranged from an object side to an image side along an optical axis.

Exemplarily, each lens is not adhered, namely there is an air space between any two adjacent lenses.

In an exemplary implementation mode, the first lens has positive refractive power or negative refractive. The second lens has positive refractive power or negative refractive power. The third lens may have positive refractive power. The fourth lens has positive refractive power or negative refractive power. The fifth lens has positive refractive power or negative refractive power. The sixth lens has positive refractive power or negative refractive power. The seventh lens has positive refractive power or negative refractive power. The eighth lens has positive refractive power or negative refractive power. The ninth lens has positive refractive power or negative refractive power. The refractive power of each component of the lens assembly, the surface types and curvatures of the lenses and the air spaces between different lenses are controlled reasonably, so that the imaging quality of the optical imaging lens assembly may be improved effectively.

In an exemplary implementation mode, the optical imaging lens assembly of the disclosure may meet conditional expression $6.0<ImgH/T89<7.0$, wherein ImgH is a half of a diagonal length of an effective pixel region on an imaging surface, and T89 is an air space of the eighth lens and the ninth lens on the optical axis. The optical imaging lens assembly meets $6.0<ImgH/T89<7.0$, so that an imaging effect of large image surface and relatively high machinability may be achieved. More specifically, ImgH and T89 may meet $6.10<ImgH/T89<6.55$.

In an exemplary implementation mode, the optical imaging lens assembly of the disclosure may meet conditional expression $-3.0<f3/f2<-2.0$, wherein f2 is an effective focal length of the second lens, and f3 is an effective focal length of the third lens. A ratio of the refractive power of the third lens to the refractive power of the second lens is reasonably controlled in this range, so that the optical sensitivity of the third lens and the optical sensitivity of the second lens may be reduced effectively to further help to implement the batch production of the second and the third lens. More specifically, f3 and f2 may meet $-2.60<f3/f2<-2.15$.

In an exemplary implementation mode, the optical imaging lens assembly of the disclosure may meet conditional expression $3.5<f5/f1<7.0$, wherein f1 is an effective focal length of the first lens, and f5 is an effective focal length of the fifth lens. A ratio of the focal length of the fifth lens to the focal length of the first lens is restricted in this range, so that an aberration may be balanced better. More specifically, f5 and f1 may meet $3.65<f5/f1<6.87$.

In an exemplary implementation mode, the optical imaging lens assembly of the disclosure may meet conditional expression $1.0<f/(f8+f9)<1.5$, wherein f is a total effective focal length of the optical imaging lens assembly, f8 is an effective focal length of the eighth lens, and f9 is an effective focal length of the ninth lens. Restricting a ratio of the total effective focal length of the optical imaging lens assembly to a sum of the effective focal length of the eighth lens and the effective focal length of the ninth lens in this range is favorable for achieving the effects of high imaging quality and high resolving power.

In an exemplary implementation mode, the optical imaging lens assembly of the disclosure may meet conditional expression $4.5\text{ mm}<TTL/Fno<5.0\text{ mm}$, wherein TTL is an on-axis distance from an object-side surface of the first lens to an imaging surface, and Fno is an f-number of the optical imaging lens assembly. A ratio of the on-axis distance between the object-side surface of the first lens and the imaging surface to the f-number of the optical imaging lens is reasonably controlled in this range, so that the luminous flux of the optical imaging lens assembly may be ensured, and meanwhile, the lens assembly is light and thin. More specifically, TTL and Fno may meet $4.65<TTL/Fno<4.85$.

In an exemplary implementation mode, the optical imaging lens assembly of the disclosure may meet conditional expression $1.0<CT8/CT1<1.5$, wherein CT1 is a center thickness of the first lens on the optical axis, and CT8 is a center thickness of the eighth lens on the optical axis. Controlling a ratio of the center thickness of the first lens on the optical axis to the center thickness of the eighth lens on the optical axis in this range is favorable for reducing an aberration of the whole optical imaging lens assembly and reducing the total length of the whole optical imaging lens assembly. More specifically, CT8 and CT1 may meet $1.20<CT8/CT1<1.30$.

In an exemplary implementation mode, the optical imaging lens assembly of the disclosure may meet conditional expression $1.0<Tan(Semi\text{-}FOV)/CT9<1.5$, wherein Semi-FOV is a half of a maximum field of view of the optical imaging lens assembly, and CT9 is a center thickness of the ninth lens on the optical axis. Controlling a ratio of a half of the maximum field of view of the optical imaging lens assembly to the center thickness of the ninth lens on the optical axis in this range is favorable for improving the large-image-surface imaging quality of the optical imaging lens assembly as well as the machining stability. More specifically, Semi-FOV and CT9 may meet $1.20<Tan(Semi\text{-}FOV)/CT9<1.35$.

In an exemplary implementation mode, the optical imaging lens assembly of the disclosure may meet conditional expression $(T12+T23)<T34$, wherein T12 is a spacing distance of the first lens and the second lens on the optical axis, T23 is a spacing distance of the second lens and the third lens on the optical axis, and T34 is a spacing distance of the third lens and the fourth lens on the optical axis. The air space of the first lens and the second lens on the optical axis, the air space of the second lens and the third lens on the optical axis and the air space of the third lens and the fourth lens on the optical axis may be reasonably controlled to meet (T12+T23)<T34 to help to implement the uniform distribution of the sizes of the lenses and ensure the assembling stability.

In an exemplary implementation mode, the optical imaging lens assembly of the disclosure may meet conditional expression R1×N1/R2<0.5, wherein R1 is a curvature radius of an object-side surface of the first lens, R2 is a curvature radius of an image-side surface of the first lens, and N1 is a refractive index of the first lens. Reasonably controlling the curvature radius of the object-side surface of the first lens, the curvature radius of the image-side surface of the first lens and the refractive index of the first lens to meet R1×N1/R2<0.5 is favorable for achieving a larger aperture of the optical system and improving the overall imaging luminance. More specifically, R1, R2 and N1 may meet R1×N1/R2<0.45.

In an exemplary implementation mode, the optical imaging lens assembly of the disclosure may meet conditional expression 2.5<R4/N2<3.5, wherein R4 is a curvature radius of an image-side surface of the second lens, and N2 is a refractive index of the second lens. Controlling a ratio of the curvature radius of the image-side surface of the second lens to the refractive index of the second lens in this range is favorable for improving a longitudinal aberration. More specifically, 2.80<R4/N2<3.30.

In an exemplary implementation mode, the optical imaging lens assembly of the disclosure may meet conditional expression 2.0<V2/R3<2.5, wherein V2 is an Abbe number of the second lens, and R3 is a curvature radius of an object-side surface of the second lens. Controlling a ratio of the Abbe number of the second lens to the curvature radius of the object-side surface of the second lens in this range is favorable for improving a lateral chromatic aberration. More specifically, 2.10<V2/R3<2 0.35.

In an exemplary implementation mode, the optical imaging lens assembly of the disclosure may meet conditional expression 2.5<f3/R6<4.0, wherein f3 is an effective focal length of the third lens, and R6 is a curvature radius of an image-side surface of the third lens. Controlling a ratio of the effective focal length of the third lens to the curvature radius of the image-side surface of the third lens in this range is favorable for reducing the sensitivity of the third lens. More specifically, f3 and R6 may meet 2.52<f3/R6<3.66.

In an exemplary implementation mode, the optical imaging lens assembly of the disclosure may meet conditional expression −2.5<R14/V7<0, wherein R14 is a curvature radius of an image-side surface of the seventh lens, and V7 is an Abbe number of the seventh lens. Reasonably controlling a ratio of the curvature radius of the image-side surface of the seventh lens to the Abbe number of the seventh lens in this range is favorable for improving a lateral chromatic aberration and avoiding the seventh lens being bent excessively. More specifically, R14 and V7 may further meet −2.35<R14/V7<−0.44.

In an exemplary implementation mode, the camera lens assembly may further include at least one diaphragm. The diaphragm may be arranged at a proper position as required. For example, the diaphragm is arranged between the object side and the first lens. For example, the diaphragm is arranged between the second lens and the third lens. Optionally, the camera lens assembly may further include an optical filter configured to correct a chromatic aberration and/or protective glass configured to protect a photosensitive element on an imaging surface.

The camera lens assembly according to the implementation mode of the disclosure may adopt multiple lenses, for example, the abovementioned nine. The refractive power and surface types of each lens, the center thickness of each lens, on-axis distances between the lenses and the like are reasonably configured, so that the large-image-surface imaging quality of the lens assembly may be improved effectively, the sensitivity of the optical imaging lens assembly may be reduced, the machinability of the optical imaging lens assembly may be improved, and the optical imaging lens assembly is more favorable for production and machining and applicable to a portable electronic product.

However, those skilled in the art should know that the number of the lenses forming the optical imaging lens assembly may be changed without departing from the technical solutions claimed in the disclosure to achieve each result and advantage described in the specification. For example, although descriptions are made in the implementation mode with nine lenses as an example, the camera lens assembly is not limited to nine lenses. If necessary, the optical imaging lens assembly may further include another number of lenses.

Specific embodiments applied to the camera lens assembly of the abovementioned implementation mode will further be described below with reference to the drawings.

Embodiment 1

An optical imaging lens assembly according to embodiment 1 of the disclosure will be described below with reference to FIGS. 1 to 2D. FIG. 1 is a structure diagram of an optical imaging lens assembly according to embodiment 1 of the disclosure.

As shown in FIG. 1, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, and an optical filter E10.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has positive refractive power, an object-side surface S5 thereof is a convex surface, while an image-side surface S6 is a concave surface. The fourth lens E4 has negative refractive power, an object-side surface S7 thereof is a concave surface, while an image-side surface S8 is a concave surface. The fifth lens E5 has positive refractive power, an object-side surface S9 thereof is a concave surface, while an image-side surface S10 is a convex surface. The sixth lens E6 has negative refractive power, an object-side surface S11 thereof is a convex surface, while an image-side surface S12 is a concave surface. The seventh lens E7 has positive refractive power, an object-side surface S13 thereof is a convex surface, while an image-side surface S14 is a convex surface. The eighth lens E8 has positive refractive power, an object-side surface S15 thereof is a convex surface, while an image-side surface S16 is a concave surface. The ninth lens E9 has negative refractive power, an object-side surface S17 thereof is a concave surface, while an image-side surface S18 is a concave surface. The optical filter E10 has an object-side surface S19 and an image-side surface S20. The camera lens assembly has an imaging surface S21. Light from an object sequentially penetrates through each of the surfaces S1 to S20 and is finally imaged on the imaging surface S21.

Table 1 is a basic parameter table of the optical imaging lens assembly of embodiment 1, and units of the curvature radius, the thickness/distance and the focal length are all millimeter (mm).

TABLE 1

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7341 | | | | |
| S1 | Aspheric | 3.0857 | 0.7767 | 1.55 | 56.1 | 7.49 | −0.0302 |
| S2 | Aspheric | 11.4406 | 0.1143 | | | | −2.8113 |
| S3 | Aspheric | 8.4557 | 0.2551 | 1.68 | 19.2 | −19.87 | 1.4911 |
| S4 | Aspheric | 5.1338 | 0.3287 | | | | −0.0142 |
| S5 | Aspheric | 9.4580 | 0.3693 | 1.55 | 56.1 | 51.24 | 12.6200 |
| S6 | Aspheric | 14.0846 | 0.4815 | | | | −32.2638 |
| S7 | Aspheric | −541.6556 | 0.3022 | 1.65 | 23.5 | −402.63 | 0.0000 |
| S8 | Aspheric | 499.7864 | 0.2003 | | | | 0.0000 |
| S9 | Aspheric | −12.6116 | 0.4029 | 1.55 | 56.1 | 51.31 | 0.0000 |
| S10 | Aspheric | −8.7972 | 0.1254 | | | | 0.0000 |
| S11 | Aspheric | 100.7496 | 0.4094 | 1.68 | 19.2 | −30.77 | 0.0000 |
| S12 | Aspheric | 17.2757 | 0.4989 | | | | 0.0000 |
| S13 | Aspheric | 283.2665 | 0.4180 | 1.57 | 37.3 | 31.62 | 0.0000 |
| S14 | Aspheric | −19.2623 | 0.7687 | | | | 0.0000 |
| S15 | Aspheric | 5.9538 | 0.9462 | 1.55 | 56.1 | 12.07 | −1.2311 |
| S16 | Aspheric | 57.8539 | 1.2936 | | | | 0.0000 |
| S17 | Aspheric | −3.8657 | 0.7523 | 1.55 | 56.1 | −5.23 | −1.3418 |
| S18 | Aspheric | 11.6966 | 0.1685 | | | | 0.0000 |
| S19 | Spherical | Infinite | 0.2100 | 1.52 | 64.2 | | |
| S20 | Spherical | Infinite | 0.6424 | | | | |
| S21 | Spherical | Infinite | | | | | |

In embodiment 1, a value of a total effective focal length f of the optical imaging lens assembly is 7.97 mm. Fno is an f-number of the optical imaging lens assembly, and a value of Fno is 1.99. TTL is an on-axis distance from the object-side surface S1 of the first lens E1 to the imaging surface S21, and a value of TTL is 9.46 mm. ImgH is a half of a diagonal length of an effective pixel region on the imaging surface S21, and a value of ImgH is 8.00 mm. Semi-FOV is a half of a maximum field of view, and a value of Semi-FOV is 44.2°.

In embodiment 1, both the object-side surface and image-side surface of any lens in the first lens E1 to the ninth lens E9 are aspheric surfaces, and a surface type x of each aspheric lens may be defined through, but not limited to, the following aspheric surface formula:

$$x = \frac{ch^2}{1 + \sqrt{1 - (k+1)c^2h^2}} + \sum A_i h^i, \quad (1)$$

wherein x is a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1); k is a conic coefficient; and Ai is a correction coefficient of the i-th order of the aspheric surface. Tables 2 and 3 show high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ that can be used for each of the aspheric mirror surfaces S1-S18 in embodiment 1.

TABLE 2

| Surface number | A4 | A6 | A8 | A10 | A12 | A14 | A16 |
|---|---|---|---|---|---|---|---|
| S1 | −1.5140E−02 | −9.5510E−03 | −3.2974E−03 | −8.2146E−04 | −2.5955E−04 | −3.8320E−05 | −3.7964E−05 |
| S2 | −1.6870E−02 | −2.2185E−03 | −2.1846E−03 | −3.5235E−04 | −1.8741E−04 | −6.9288E−05 | −4.2553E−05 |
| S3 | 6.4905E−02 | 9.7944E−03 | −1.6272E−03 | −5.2081E−05 | −1.7790E−04 | −1.1583E−04 | −1.1982E−04 |
| S4 | 9.6242E−02 | 1.1495E−02 | −1.4110E−03 | −8.7248E−04 | −5.0311E−04 | −1.8664E−04 | −1.0199E−04 |
| S5 | −2.0393E−03 | 2.7581E−02 | 6.5278E−03 | 6.3145E−04 | −2.4861E−04 | −1.2638E−04 | −5.7110E−05 |
| S6 | 3.8109E−03 | 2.0269E−02 | 6.8956E−03 | 1.4978E−03 | 3.0929E−04 | 3.4207E−05 | 3.0566E−05 |
| S7 | −2.3262E−01 | −2.4611E−02 | −4.7327E−03 | −1.9518E−03 | −6.4341E−04 | −4.1578E−04 | −6.1143E−05 |
| S8 | −3.3758E−01 | −3.1992E−02 | 1.9442E−03 | 9.8833E−03 | 1.6823E−03 | 4.7782E−04 | 6.1473E−04 |
| S9 | −3.3619E−01 | −2.5882E−02 | 2.3985E−03 | 6.0365E−03 | 3.9066E−03 | 5.3649E−04 | 2.4160E−04 |
| S10 | −3.7826E−01 | −4.0580E−02 | 1.7171E−02 | 1.1842E−03 | 3.7850E−03 | 8.0672E−04 | 1.0615E−03 |
| S11 | −4.8805E−01 | −1.2817E−02 | −2.4547E−02 | −6.3374E−03 | −1.5572E−03 | −1.0471E−03 | 4.5198E−04 |
| S12 | −6.9622E−01 | 5.2697E−02 | −2.1723E−02 | 6.9221E−03 | 1.7976E−03 | 1.0069E−03 | 7.2939E−04 |
| S13 | −8.5088E−01 | 5.9185E−01 | 3.2407E−01 | −5.7758E−02 | −1.7234E−01 | −1.3727E−01 | −6.6304E−02 |
| S14 | −6.9842E−01 | 1.1939E−01 | 2.0149E−02 | −1.0081E−02 | −4.3250E−03 | 3.6580E−03 | 2.3446E−04 |
| S15 | −3.8808E+00 | 1.6735E+00 | 5.7923E−01 | 4.0624E−01 | 3.4079E−01 | 2.0969E−01 | 1.1163E−01 |
| S16 | −2.0140E+00 | 1.9703E−01 | 4.5693E−02 | −4.5366E−02 | 3.1109E−02 | −3.3999E−03 | 9.0962E−04 |
| S17 | 2.6645E+00 | 6.3992E−02 | −2.3188E−01 | 1.2181E−01 | −3.7527E−02 | −1.1093E−02 | 1.8638E−02 |
| S18 | −4.5717E+00 | 5.8410E−01 | −1.2779E−01 | 1.0207E−01 | −5.6576E−02 | −4.6362E−03 | −3.0704E−03 |

TABLE 3

| Surface number | A18 | A20 | A22 | A24 | A26 | A28 | A30 |
|---|---|---|---|---|---|---|---|
| S1 | −2.5140E−05 | −4.4278E−05 | −2.1022E−05 | −1.5232E−05 | −6.6479E−06 | −4.4604E−06 | −2.7084E−07 |
| S2 | −4.9904E−05 | −4.7012E−05 | −3.6652E−05 | −9.1037E−06 | 1.4654E−05 | 8.7341E−06 | 9.2415E−07 |
| S3 | −1.1108E−04 | −8.0566E−05 | −7.1961E−05 | −5.1085E−05 | −2.8120E−05 | −1.0037E−05 | −1.0982E−05 |
| S4 | −8.3708E−05 | −5.7658E−05 | −3.9293E−05 | −1.7735E−05 | −7.7814E−06 | −4.8001E−06 | −1.0768E−06 |
| S5 | −2.0393E−03 | 2.7581E−02 | 6.5278E−02 | 6.3145E−04 | −2.4861E−04 | −1.2638E−04 | −5.7110E−05 |
| S6 | 1.1045E−07 | 7.9919E−06 | −3.0354E−06 | 2.0717E−06 | −5.6487E−06 | −5.5266E−06 | −5.2686E−06 |
| S7 | −2.4323E−05 | 4.2472E−05 | 1.1848E−05 | 1.3398E−05 | −3.6130E−06 | −1.5026E−06 | −2.2814E−06 |
| S8 | 2.9498E−04 | 2.6799E−04 | 7.6436E−05 | 5.2468E−05 | −3.8794E−06 | 6.9320E−06 | −4.5994E−06 |
| S9 | −1.7267E−04 | −5.9253E−05 | −1.1869E−04 | −2.2130E−05 | −1.9232E−05 | 1.3636E−05 | 7.7318E−06 |
| S10 | −1.1094E−04 | 4.5115E−05 | −2.0004E−04 | 1.4430E−05 | −5.5072E−05 | 1.6206E−05 | −7.3625E−07 |
| S11 | −2.5639E−04 | 1.2501E−04 | −8.2065E−05 | 1.1345E−04 | −2.1308E−05 | 4.1627E−05 | 7.4885E−07 |
| S12 | 1.4754E−05 | 2.4007E−04 | 7.8100E−05 | 1.2059E−04 | −3.2384E−05 | 2.2295E−05 | −2.2308E−05 |
| S13 | −1.9041E−02 | −2.4496E−03 | −5.2105E−04 | −4.7007E−05 | 1.2069E−04 | 3.4900E−04 | 5.0389E−05 |
| S14 | −7.9258E−04 | 1.6140E−04 | −2.7956E−05 | 2.4034E−04 | 4.3763E−05 | 8.5180E−05 | 3.1938E−05 |
| S15 | 5.2692E−02 | 1.5579E−02 | −1.2624E−03 | −1.2156E−04 | 4.0313E−04 | 6.4897E−04 | −7.3982E−05 |
| S16 | −1.3683E−03 | 1.0995E−03 | 1.3159E−04 | 3.8463E−04 | −7.2504E−05 | −5.4149E−06 | −3.4778E−05 |
| S17 | −1.1329E−02 | 3.1553E−03 | −2.2008E−05 | −2.0183E−04 | 7.6108E−05 | 1.5423E−04 | −8.2680E−05 |
| S18 | −2.2641E−03 | 8.9102E−04 | −2.8708E−05 | −8.0762E−04 | −1.8501E−04 | 1.7408E−04 | 3.3045E−04 |

Figure 2A:
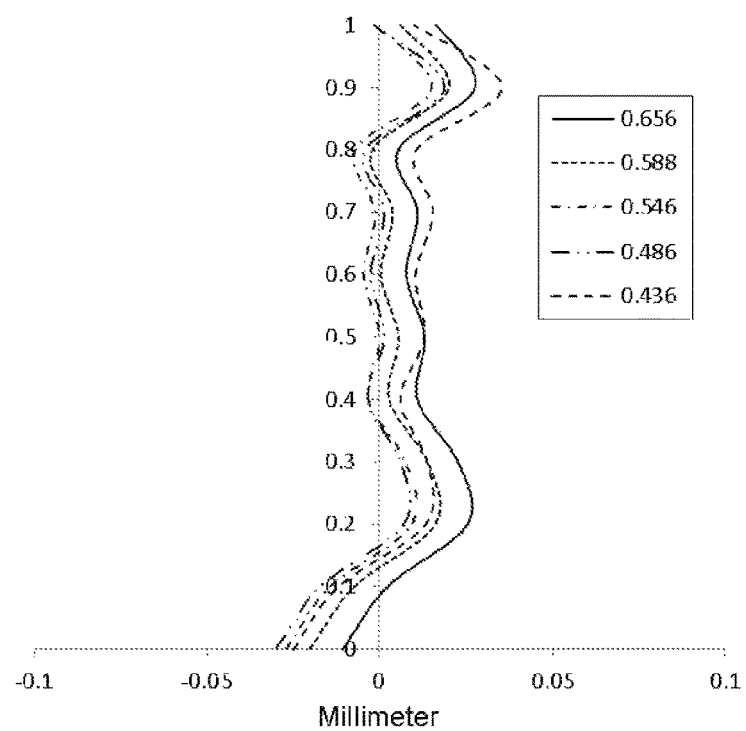
FIGS. 2A to 2D show a longitudinal aberration curve, an astigmatism curve, a distortion curve and a lateral color curve of an optical imaging lens group according to embodiment 1 respectively.
Figure 2B:
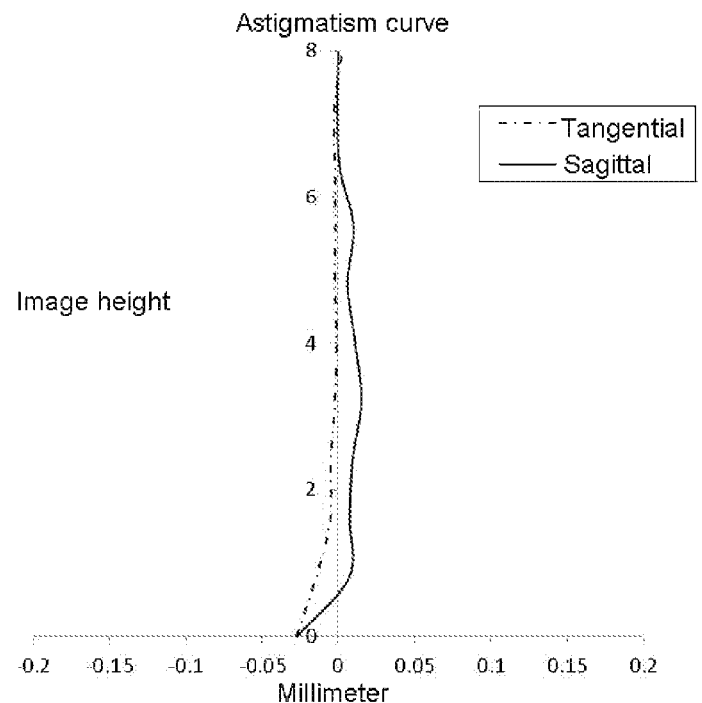
Figure 2C:
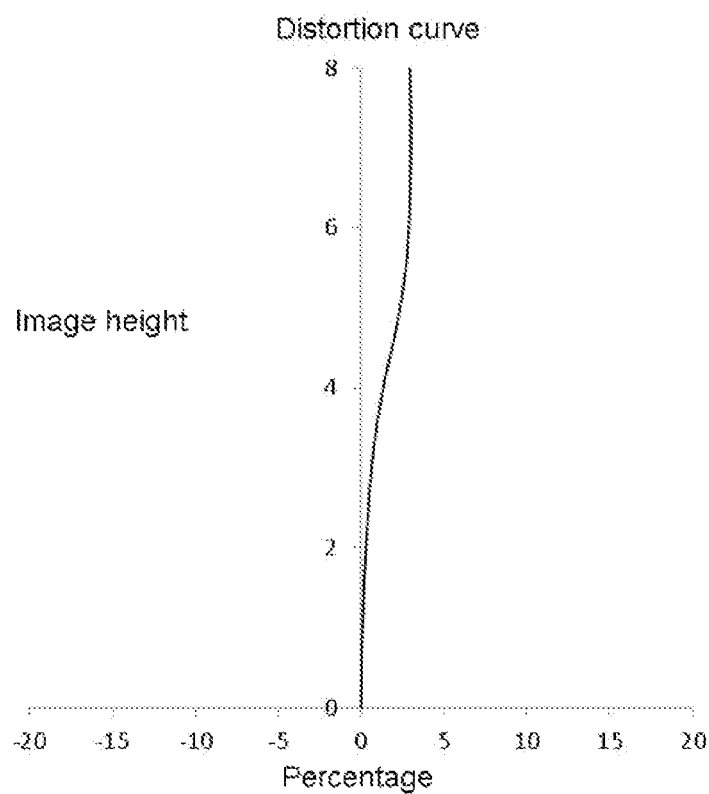
Figure 2D:
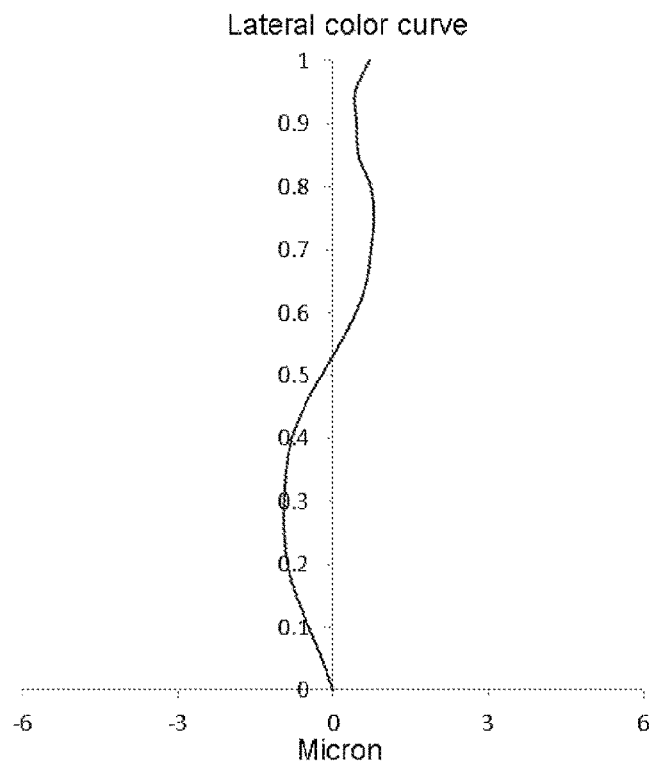

FIG. 2A shows a longitudinal aberration curve of the optical imaging lens assembly according to embodiment 1 to represent deviation of a convergence focal point after light with different wavelengths passes through the lens. FIG. 2B shows an astigmatism curve of the optical imaging lens assembly according to embodiment 1 to represent a tangential image surface curvature and a sagittal image surface curvature. FIG. 2C shows a distortion curve of the optical imaging lens assembly according to embodiment 1 to represent distortion values corresponding to different fields of view. FIG. 2D shows a lateral color curve of the optical imaging lens assembly according to embodiment 1 to represent deviation of different image heights on the imaging surface after the light passes through the lens assembly. According to FIGS. 2A to 2D, it can be seen that the optical imaging lens assembly provided in embodiment 1 may achieve high imaging quality.

Embodiment 2

Figure 3:
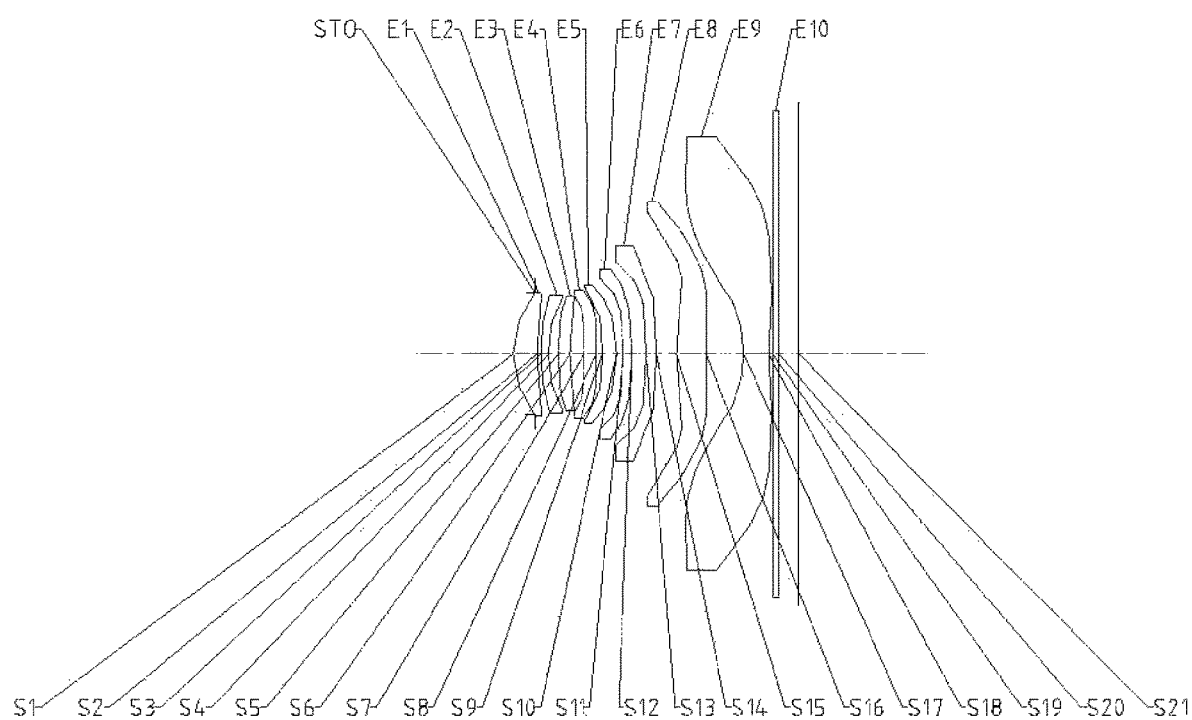
FIG. 3 shows a structure diagram of an optical imaging lens group according to embodiment 2 of the disclosure.

An optical imaging lens assembly according to embodiment 2 of the disclosure will be described below with reference to FIGS. 3 to 4D. In the embodiment and the following embodiments, part of descriptions similar to those about embodiment 1 are omitted for simplicity. FIG. 3 is a structure diagram of an optical imaging lens assembly according to embodiment 2 of the disclosure.

As shown in FIG. 3, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, and an optical filter E10.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has positive refractive power, an object-side surface S5 thereof is a convex surface, while an image-side surface S6 is a concave surface. The fourth lens E4 has negative refractive power, an object-side surface S7 thereof is a concave surface, while an image-side surface S8 is a concave surface. The fifth lens E5 has positive refractive power, an object-side surface S9 thereof is a concave surface, while an image-side surface S10 is a convex surface. The sixth lens E6 has negative refractive power, an object-side surface S11 thereof is a concave surface, while an image-side surface S12 is a convex surface. The seventh lens E7 has negative refractive power, an object-side surface S13 thereof is a concave surface, while an image-side surface S14 is a convex surface. The eighth lens E8 has positive refractive power, an object-side surface S15 thereof is a convex surface, while an image-side surface S16 is a concave surface. The ninth lens E9 has negative refractive power, an object-side surface S17 thereof is a concave surface, while an image-side surface S18 is a concave surface. The optical filter E10 has an object-side surface S19 and an image-side surface S20. The optical imaging lens assembly has an imaging surface S21. Light from an object sequentially penetrates through each of the surfaces S1 to S20 and is finally imaged on the imaging surface S21.

In embodiment 2, a value of a total effective focal length f of the optical imaging lens assembly is 7.84 mm. Fno is an f-number of the optical imaging lens assembly, and a value of Fno is 1.98. TTL is an on-axis distance from the object-side surface S1 of the first lens E1 to the imaging surface S21, and a value of TTL is 9.34 mm. ImgH is a half of a diagonal length of an effective pixel region on the imaging surface S21, and a value of ImgH is 8.00 mm. Semi-FOV is a half of a maximum field of view, and a value of Semi-FOV is 44.8°.

Table 4 is a basic parameter table of the optical imaging lens assembly of embodiment 2, and units of the curvature radius, the thickness/distance and the focal length are all millimeter (mm). Tables 5 and Table 6 show high-order coefficients that can be used for each aspheric mirror surface in embodiment 2. A surface type of each aspheric surface may be defined by formula (1) given in embodiment 1.

TABLE 4

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7341 | | | | |
| S1 | Aspheric | 3.0907 | 0.7729 | 1.55 | 56.1 | 7.39 | −0.0545 |
| S2 | Aspheric | 12.0112 | 0.1250 | | | | −3.5727 |
| S3 | Aspheric | 8.4688 | 0.2500 | 1.68 | 19.2 | −18.70 | 1.1471 |
| S4 | Aspheric | 5.0191 | 0.3232 | | | | −0.1566 |
| S5 | Aspheric | 9.3867 | 0.3788 | 1.55 | 56.1 | 44.38 | 12.2532 |
| S6 | Aspheric | 15.0954 | 0.4711 | | | | −53.4106 |
| S7 | Aspheric | −178.9891 | 0.4029 | 1.65 | 23.5 | −140.68 | 0.0000 |
| S8 | Aspheric | 184.5050 | 0.1955 | | | | 0.0000 |
| S9 | Aspheric | −10.1058 | 0.4652 | 1.55 | 56.1 | 27.24 | 0.0000 |
| S10 | Aspheric | −6.1172 | 0.2211 | | | | 0.0000 |
| S11 | Aspheric | −26.5215 | 0.2830 | 1.68 | 19.2 | −300.00 | 0.0000 |
| S12 | Aspheric | −30.6237 | 0.4707 | | | | 0.0000 |
| S13 | Aspheric | −21.4651 | 0.3200 | 1.57 | 37.3 | −50.00 | 0.0000 |
| S14 | Aspheric | −87.0838 | 0.6514 | | | | 0.0000 |
| S15 | Aspheric | 5.4335 | 0.9778 | 1.55 | 56.1 | 10.66 | −1.1505 |
| S16 | Aspheric | 75.3778 | 1.2302 | | | | 0.0000 |
| S17 | Aspheric | −3.8611 | 0.8079 | 1.55 | 56.1 | −5.21 | −1.3503 |
| S18 | Aspheric | 11.6143 | 0.1405 | | | | 0.0000 |
| S19 | Spherical | Infinite | 0.2100 | 1.52 | 64.2 | | |
| S20 | Spherical | Infinite | 0.6424 | | | | |
| S21 | Spherical | Infinite | | | | | |

TABLE 5

| Surface number | A4 | A6 | A8 | A10 | A12 | A14 | A16 |
|---|---|---|---|---|---|---|---|
| S1 | −1.7345E−02 | −9.3330E−03 | −3.3281E−03 | −8.0442E−04 | −3.3015E−04 | −4.0626E−05 | −3.5718E−05 |
| S2 | −1.6542E−02 | −3.2992E−03 | −1.8776E−03 | −4.9367E−04 | −1.8209E−04 | 1.4889E−05 | 2.5263E−05 |
| S3 | 6.0170E−02 | 7.7815E−03 | −1.1403E−03 | −3.3925E−04 | 2.1569E−05 | 8.1780E−05 | 1.5870E−05 |
| S4 | 9.1104E−02 | 1.1832E−02 | −5.3400E−04 | −8.7941E−04 | −4.0287E−04 | 1.6246E−05 | 5.9180E−05 |
| S5 | −5.6120E−03 | 2.8625E−02 | 7.6257E−03 | 6.9165E−04 | −4.1238E−04 | −1.0009E−04 | 1.4123E−05 |
| S6 | −2.0756E−04 | 2.0651E−02 | 7.9745E−03 | 1.6261E−03 | 2.6394E−04 | −2.9161E−05 | 3.5345E−05 |
| S7 | −2.5407E−01 | −2.1448E−02 | −4.2035E−03 | −2.0732E−03 | −7.1476E−04 | −3.6981E−04 | −1.5642E−05 |
| S8 | −3.5738E−01 | −3.0641E−02 | 1.8213E−03 | −8.8316E−03 | 6.6356E−04 | 9.4392E−05 | 5.4940E−04 |
| S9 | −3.3487E−01 | −2.7285E−02 | 2.4712E−02 | 6.7743E−03 | 4.4346E−03 | 1.0346E−03 | 8.5598E−04 |
| S10 | −3.8739E−01 | −3.0437E−02 | 1.5817E−02 | 4.1705E−03 | 4.9832E−03 | 1.4807E−03 | 1.6027E−03 |
| S11 | −5.1113E−01 | −8.3501E−03 | −2.4238E−02 | −8.5498E−03 | −1.8793E−03 | −8.3953E−04 | 1.1374E−03 |
| S12 | −6.8331E−01 | 3.3781E−02 | −2.1851E−02 | 7.1671E−03 | 6.0587E−03 | 1.3165E−03 | −5.5169E−04 |
| S13 | −7.7101E−01 | −9.8063E−02 | 3.5266E−02 | 8.6072E−03 | 6.5635E−03 | 4.6485E−03 | 1.6373E−03 |
| S14 | −7.3488E−01 | 9.1395E−02 | 1.6586E−02 | −8.6430E−03 | −2.8799E−03 | 2.8085E−03 | −1.0541E−04 |
| S15 | −2.9832E+00 | 3.4844E−01 | 4.3201E−02 | −1.5028E−02 | −3.9951E−04 | 2.8300E−03 | −2.6527E−04 |
| S16 | −1.9966E+00 | 1.6909E−01 | 6.3330E−02 | −4.0865E−02 | 3.9289E−02 | −4.2453E−03 | −2.0628E−03 |
| S17 | 2.7889E+00 | 4.0820E−02 | −2.3235E−01 | 1.2309E−01 | −4.2118E−02 | −8.0646E−03 | 1.6106E−02 |
| S18 | −4.5536E+00 | 5.7799E−01 | −9.4599E−02 | 1.0086E−01 | −6.3579E−02 | −6.2288E−03 | 2.9048E−03 |

TABLE 6

| Surface number | A18 | A20 | A22 | A24 | A26 | A28 | A30 |
|---|---|---|---|---|---|---|---|
| S1 | 8.3750E−07 | −3.8530E−05 | −1.8372E−05 | −1.9943E−05 | −4.9010E−06 | −3.5264E−06 | 1.4916E−06 |
| S2 | 2.7287E−06 | −2.1974E−05 | −2.5156E−05 | −1.2442E−05 | 1.6930E−05 | 1.0146E−05 | 7.8495E−06 |
| S3 | −7.9454E−05 | −7.4973E−05 | −8.6220E−05 | −5.3766E−05 | −3.3589E−05 | −1.6938E−05 | −1.8666E−05 |
| S4 | 2.0894E−06 | −2.3777E−05 | −2.9746E−05 | −1.6476E−05 | −5.2166E−06 | −6.5550E−06 | 1.6269E−06 |
| S5 | 2.7479E−05 | −1.0738E−05 | −6.7079E−06 | −5.1406E−06 | 1.8567E−06 | 2.8085E−06 | 1.8169E−06 |
| S6 | −4.5393E−06 | 2.1713E−05 | −3.1498E−06 | 8.9804E−06 | −1.0271E−05 | −6.1817E−06 | −9.1570E−06 |
| S7 | −2.7696E−05 | 1.5405E−05 | −2.3894E−05 | −1.7847E−05 | −2.3653E−05 | −1.5350E−05 | −7.3462E−06 |
| S8 | 1.7027E−04 | 1.7696E−04 | −8.9038E−06 | 1.2953E−05 | −7.0642E−06 | 7.2754E−07 | −4.2791E−06 |
| S9 | −6.8104E−05 | −6.5530E−05 | −2.2309E−04 | −5.8063E−05 | 2.7618E−06 | 1.2296E−05 | 5.0533E−06 |
| S10 | 2.1925E−04 | 3.5265E−04 | −4.1500E−05 | 8.9540E−05 | 3.8379E−05 | 4.1359E−05 | 9.6145E−06 |
| S11 | −7.1380E−05 | 3.4345E−04 | −1.4365E−04 | 1.1645E−04 | 1.5671E−05 | 2.2260E−05 | 1.5744E−05 |
| S12 | −7.9897E−04 | 1.2341E−03 | 6.9201E−04 | 4.0216E−04 | −2.4980E−04 | −3.7855E−05 | −5.0041E−05 |
| S13 | −5.1295E−04 | −1.6911E−04 | 1.6242E−04 | 6.0944E−04 | 1.7632E−04 | 2.6459E−05 | −4.0366E−05 |

TABLE 6-continued

| Surface number | A18 | A20 | A22 | A24 | A26 | A28 | A30 |
|---|---|---|---|---|---|---|---|
| S14 | −4.1730E−04 | 1.1569E−04 | 1.0109E−04 | 9.6097E−05 | −1.3341E−04 | 6.6478E−07 | 1.9637E−05 |
| S15 | −1.0877E−03 | 3.3044E−04 | 1.5401E−04 | −5.3991E−05 | −2.4960E−05 | 5.7554E−06 | 4.1433E−07 |
| S16 | −2.6686E−03 | 2.6745E−04 | −8.5623E−04 | −3.3892E−04 | 3.1880E−05 | −8.0356E−05 | −5.6256E−05 |
| S17 | −1.3271E−02 | 3.5142E−03 | −8.0707E−04 | −3.9579E−04 | −4.7902E−04 | 2.5717E−04 | −4.8897E−04 |
| S18 | −1.6163E−03 | 2.0587E−03 | −1.7426E−03 | −3.5429E−04 | −1.6171E−03 | 3.7964E−04 | −1.8943E−05 |

Figure 4A:
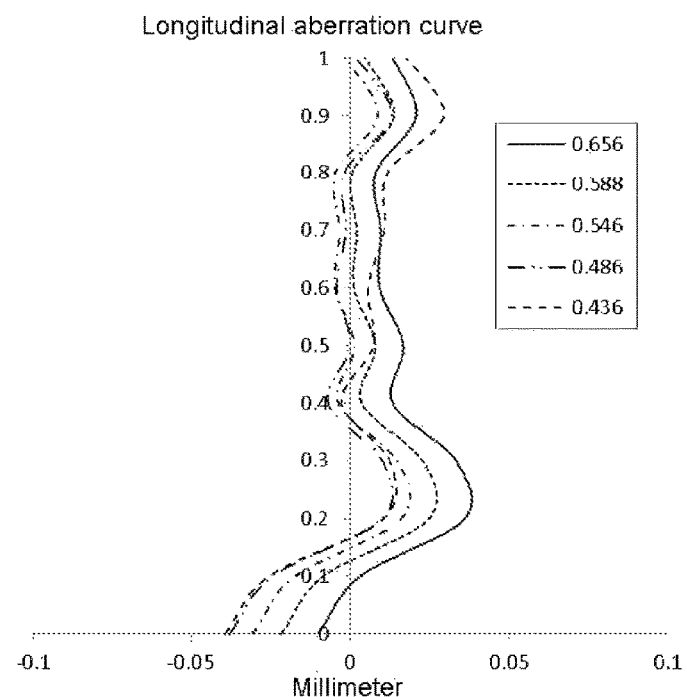
FIGS. 4A to 4D show a longitudinal aberration curve, an astigmatism curve, a distortion curve and a lateral color curve of an optical imaging lens group according to embodiment 2 respectively.
Figure 4B:
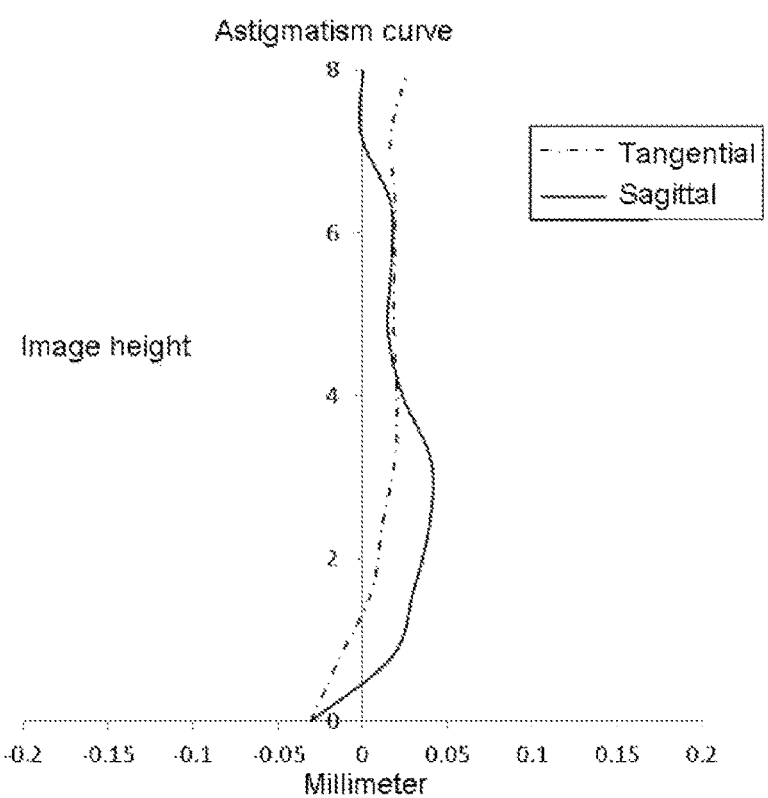
Figure 4C:
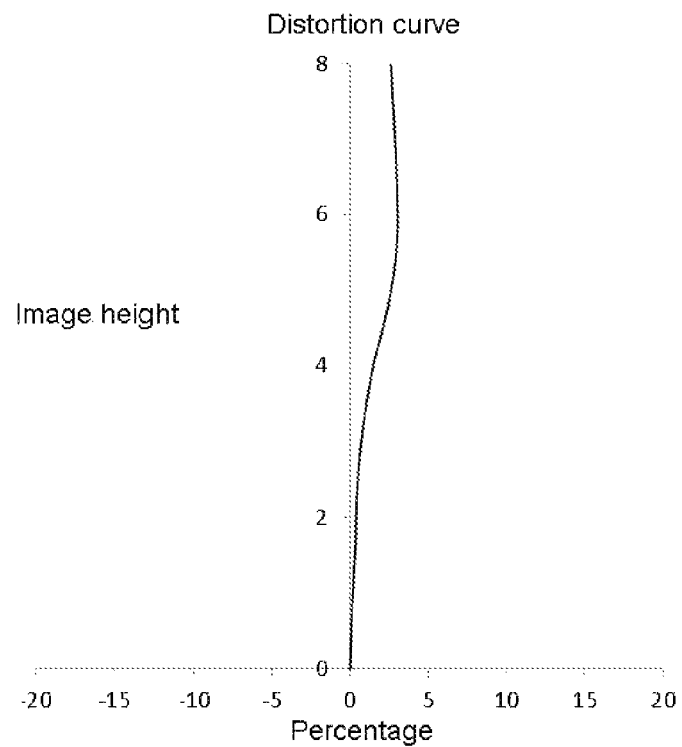
Figure 4D:
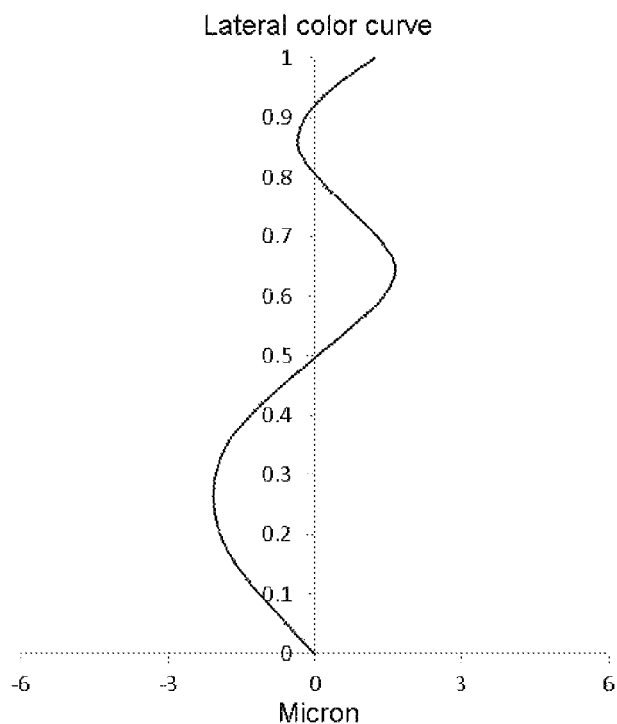

FIG. 4A shows a longitudinal aberration curve of the optical imaging lens assembly according to embodiment 2 to represent deviation of a convergence focal point after light with different wavelengths passes through the lens. FIG. 4B shows an astigmatism curve of the optical imaging lens assembly according to embodiment 2 to represent a tangential image surface curvature and a sagittal image surface curvature. FIG. 4C shows a distortion curve of the optical imaging lens assembly according to embodiment 2 to represent distortion values corresponding to different fields of view. FIG. 4D shows a lateral color curve of the optical imaging lens assembly according to embodiment 2 to represent deviation of different image heights on the imaging surface after the light passes through the lens assembly. According to FIGS. 4A to 4D, it can be seen that the optical imaging lens assembly provided in embodiment 2 may achieve high imaging quality.

Embodiment 3

Figure 5:
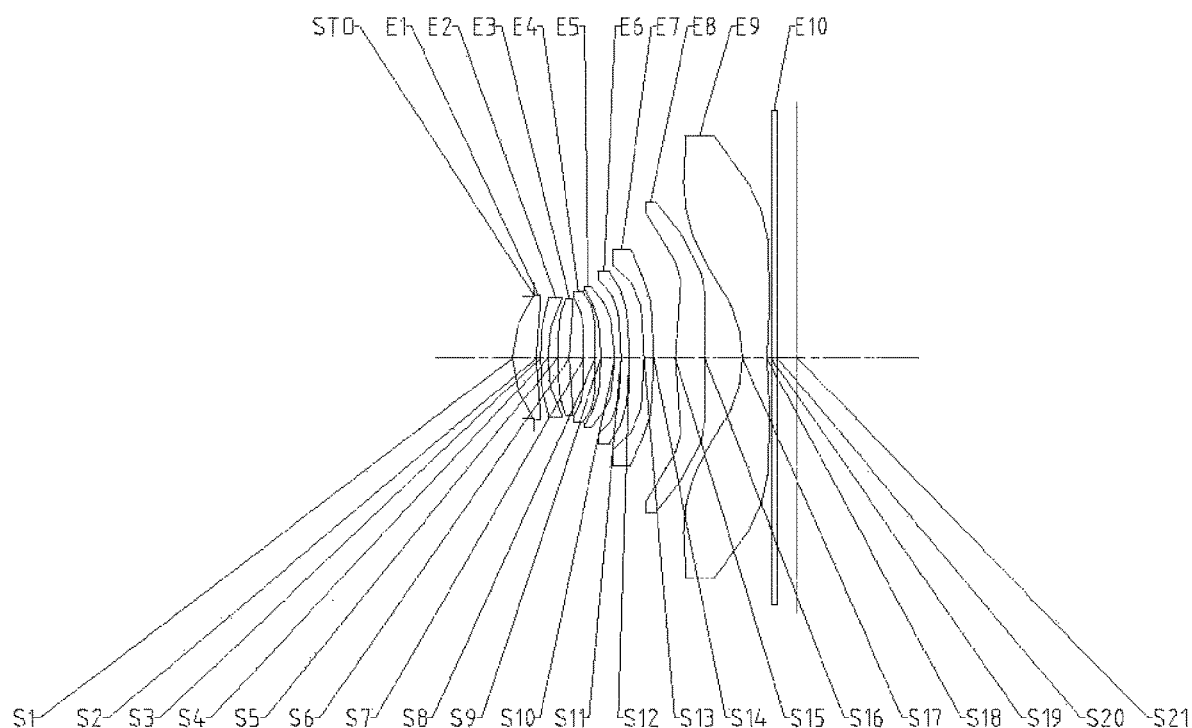
FIG. 5 shows a structure diagram of an optical imaging lens group according to embodiment 3 of the disclosure.

An optical imaging lens assembly according to embodiment 3 of the disclosure is described below with reference to FIGS. 5 to 6D. FIG. 5 shows a structure diagram of an optical imaging lens assembly according to embodiment 3 of the disclosure.

As shown in FIG. 5, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, and an optical filter E10.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has positive refractive power, an object-side surface S5 thereof is a convex surface, while an image-side surface S6 is a concave surface. The fourth lens E4 has negative refractive power, an object-side surface S7 thereof is a concave surface, while an image-side surface S8 is a concave surface. The fifth lens E5 has positive refractive power, an object-side surface S9 thereof is a concave surface, while an image-side surface S10 is a convex surface. The sixth lens E6 has positive refractive power, an object-side surface S11 thereof is a concave surface, while an image-side surface S12 is a convex surface. The seventh lens E7 has negative refractive power, an object-side surface S13 thereof is a concave surface, while an image-side surface S14 is a convex surface. The eighth lens E8 has positive refractive power, an object-side surface S15 thereof is a convex surface, while an image-side surface S16 is a concave surface. The ninth lens E9 has negative refractive power, an object-side surface S17 thereof is a concave surface, while an image-side surface S18 is a concave surface. The optical filter E10 has an object-side surface S19 and an image-side surface S20. The optical imaging lens assembly has an imaging surface S21. Light from an object sequentially penetrates through each of the surfaces S1 to S20 and is finally imaged on the imaging surface S21.

In embodiment 3, a value of a total effective focal length f of the camera lens assembly is 7.83 mm. Fno is an f-number of the camera lens assembly, and a value of Fno is 1.98. TTL is an on-axis distance from the object-side surface S1 of the first lens E1 to the imaging surface S21, and a value of TTL is 9.31 mm. ImgH is a half of a diagonal length of an effective pixel region on the imaging surface S21, and a value of ImgH is 8.00 mm. Semi-FOV is a half of a maximum field of view, and a value of Semi-FOV is 44.8°.

Table 7 is a basic parameter table of the optical imaging lens assembly of embodiment 3, and units of the curvature radius, the thickness/distance and the focal length are all millimeter (mm). Tables 8 and Table 9 show high-order coefficients that can be used for each aspheric mirror surface in embodiment 3. A surface type of each aspheric surface may be defined by formula (1) given in embodiment 1.

TABLE 7

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.7341 | | | | |
| S1 | Aspheric | 3.0856 | 0.7808 | 1.55 | 56.1 | 7.39 | −0.0489 |
| S2 | Aspheric | 11.9161 | 0.1301 | | | | −3.2312 |
| S3 | Aspheric | 8.8710 | 0.2500 | 1.68 | 19.2 | −18.56 | 1.2368 |
| S4 | Aspheric | 5.1471 | 0.3146 | | | | −0.1871 |
| S5 | Aspheric | 9.3585 | 0.3809 | 1.55 | 56.1 | 40.54 | 12.3651 |
| S6 | Aspheric | 15.9708 | 0.4777 | | | | −51.4378 |
| S7 | Aspheric | −60.0000 | 0.4047 | 1.65 | 23.5 | −82.64 | 0.0000 |
| S8 | Aspheric | 482.3203 | 0.1720 | | | | 0.0000 |
| S9 | Aspheric | −11.3029 | 0.4552 | 1.55 | 56.1 | 29.52 | 0.0000 |
| S10 | Aspheric | −6.7414 | 0.2026 | | | | 0.0000 |

TABLE 7-continued

| Surface number | Surface type | Curvature radius | Thickness/ distance | Material Refractive index | Abbe number | Focal length | Conic coefficient |
|---|---|---|---|---|---|---|---|
| S11 | Aspheric | −46.5381 | 0.2673 | 1.68 | 19.2 | 300.00 | 0.0000 |
| S12 | Aspheric | −37.9701 | 0.4764 | | | | 0.0000 |
| S13 | Aspheric | −21.0862 | 0.3200 | 1.57 | 37.3 | −55.39 | 0.0000 |
| S14 | Aspheric | −63.6620 | 0.6986 | | | | 0.0000 |
| S15 | Aspheric | 5.5615 | 0.9684 | 1.55 | 56.1 | 10.97 | −1.1391 |
| S16 | Aspheric | 72.1733 | 1.2259 | | | | 0.0000 |
| S17 | Aspheric | −3.8624 | 0.7923 | 1.55 | 56.1 | −5.20 | −1.3501 |
| S18 | Aspheric | 11.5647 | 0.1412 | | | | 0.0000 |
| S19 | Spherical | Infinite | 0.2100 | 1.52 | 64.2 | | |
| S20 | Spherical | Infinite | 0.6424 | | | | |
| S21 | Spherical | Infinite | | | | | |

TABLE 8

| Surface number | A4 | A6 | A8 | A10 | A12 | A14 | A16 |
|---|---|---|---|---|---|---|---|
| S1 | −1.6629E−02 | −9.2474E−03 | −3.3569E−03 | −7.9573E−04 | −3.1077E−04 | −4.1736E−05 | −3.5885E−05 |
| S2 | −1.6201E−02 | −3.4860E−03 | −1.8443E−03 | −3.3239E−04 | −1.8488E−04 | 7.5460E−05 | 2.7527E−05 |
| S3 | 6.0433E−02 | 7.6909E−03 | −8.5588E−04 | −7.5627E−05 | 2.8721E−05 | 1.2955E−04 | −3.4345E−05 |
| S4 | 9.0732E−02 | 1.1786E−02 | −4.0807E−04 | −7.6549E−04 | −3.6387E−04 | 2.9094E−05 | 8.6741E−06 |
| S5 | −5.0584E−03 | 2.8631E−02 | 7.7190E−03 | 7.1388E−04 | −3.0251E−04 | −4.4778E−05 | 5.0091E−06 |
| S6 | 2.9132E−04 | 2.0694E−02 | 7.9298E−03 | 1.5960E−03 | 3.0826E−04 | 3.7766E−06 | 6.3783E−05 |
| S7 | −2.4968E−01 | −2.1970E−02 | −4.6894E−03 | −2.2083E−03 | −6.5559E−04 | −3.3562E−04 | 6.2592E−05 |
| S8 | −3.5498E−01 | −3.1162E−02 | 2.0313E−03 | −8.0904E−04 | 9.3874E−04 | 6.7752E−05 | 6.7174E−04 |
| S9 | −3.3512E−01 | −2.8767E−02 | 2.5044E−02 | 6.4617E−03 | 4.5130E−03 | 7.4619E−04 | 8.0923E−04 |
| S10 | −3.9215E−01 | −2.9554E−02 | 1.5796E−02 | 3.9317E−03 | 4.9604E−03 | 1.2312E−03 | 1.4323E−03 |
| S11 | −5.1975E−01 | −7.4270E−03 | −2.4209E−02 | −8.0287E−03 | −1.7964E−03 | −9.6428E−04 | 9.4852E−04 |
| S12 | −6.8047E−01 | 3.3579E−02 | −2.0157E−02 | 6.7802E−03 | 5.2523E−03 | 1.6393E−03 | 1.3483E−04 |
| S13 | −7.7506E−01 | −8.9733E−02 | 4.1544E−02 | 9.8865E−03 | 4.4017E−03 | 3.0179E−03 | 1.5602E−03 |
| S14 | −7.3894E−01 | 9.1438E−02 | 1.6755E−02 | −8.4223E−03 | −2.7443E−03 | 2.9507E−03 | −1.4935E−04 |
| S15 | −2.9804E+00 | 3.4817E−01 | 4.4737E−02 | −1.5001E−02 | −2.6140E−04 | 2.8272E−03 | −2.7198E−04 |
| S16 | −2.0012E+00 | 1.7721E−01 | 6.4229E−02 | −3.9873E−02 | 3.6851E−02 | −4.1694E−03 | −1.6658E−03 |
| S17 | 2.7883E+00 | 4.0521E−02 | −2.3159E−01 | 1.2471E−01 | −4.1514E−02 | −8.1806E−03 | 1.6737E−02 |
| S18 | −4.5782E+00 | 5.7875E−01 | −9.2966E−02 | 9.9188E−02 | −6.3078E−02 | −5.8491E−03 | 1.6052E−03 |

TABLE 9

| Surface number | A18 | A20 | A22 | A24 | A26 | A28 | A30 |
|---|---|---|---|---|---|---|---|
| S1 | −4.5293E−06 | −4.0582E−05 | −2.5231E−05 | −2.7050E−05 | −8.5342E−06 | −4.7494E−06 | 3.5246E−07 |
| S2 | 2.0970E−05 | −2.3355E−05 | −9.5004E−06 | −7.1764E−06 | 2.4992E−05 | 1.4825E−05 | 1.2971E−05 |
| S3 | −1.0821E−04 | −1.2499E−04 | −1.1196E−04 | −8.6487E−05 | −5.4516E−05 | −3.3603E−05 | −2.2356E−05 |
| S4 | −5.2299E−05 | −7.0442E−05 | −5.8984E−05 | −3.7411E−05 | −1.5620E−05 | −9.3477E−06 | 9.3292E−07 |
| S5 | 2.5771E−05 | −5.1331E−05 | −1.0474E−05 | −6.0463E−06 | −4.9822E−06 | −3.4513E−06 | −4.4790E−06 |
| S6 | −2.0551E−06 | 2.4247E−05 | −6.6154E−06 | 9.4704E−06 | −8.3100E−06 | −2.3840E−06 | −6.8676E−06 |
| S7 | −9.3984E−06 | 2.5966E−05 | −2.9060E−05 | −1.8185E−05 | −2.4189E−05 | −1.3179E−05 | −4.7976E−06 |
| S8 | 1.7597E−04 | 1.8842E−04 | −2.8879E−05 | 3.6420E−06 | −1.2836E−05 | −3.2105E−06 | −6.6205E−06 |
| S9 | −1.5115E−04 | −1.0842E−04 | −2.5624E−04 | −6.3423E−05 | 1.0729E−05 | 1.6259E−05 | 1.0687E−05 |
| S10 | 1.0854E−04 | 2.9829E−04 | −9.4633E−05 | 6.5653E−05 | 2.5447E−05 | 2.7270E−05 | −2.2192E−07 |
| S11 | −5.9464E−06 | 3.5823E−04 | −1.7683E−04 | 1.1257E−04 | 2.3913E−05 | 1.8917E−05 | 1.4102E−05 |
| S12 | −6.0803E−04 | 6.4306E−04 | 4.6917E−05 | −1.6034E−04 | −6.3776E−04 | −1.6496E−04 | −6.6427E−05 |
| S13 | 3.1984E−04 | 4.4515E−04 | 3.0456E−04 | 5.7328E−04 | 7.3323E−05 | −2.4668E−05 | −6.9039E−05 |
| S14 | −3.3651E−04 | 1.4075E−04 | 7.1936E−05 | 8.3301E−05 | −1.4802E−04 | 2.0421E−05 | 1.5126E−05 |
| S15 | −1.0918E−03 | 3.2725E−04 | 1.5214E−04 | −5.4840E−05 | −2.5283E−05 | 5.6722E−06 | 4.0533E−07 |
| S16 | −2.6708E−03 | 3.9108E−04 | −4.7723E−04 | −1.3435E−05 | 1.3981E−04 | −1.4006E−04 | −1.7442E−04 |
| S17 | −1.2996E−02 | 3.5913E−03 | −4.9650E−04 | −2.4442E−04 | −6.0347E−04 | 3.0227E−04 | −1.6548E−04 |
| S18 | −5.5451E−04 | 3.4189E−03 | −8.6453E−04 | −1.6917E−03 | −2.3525E−03 | 2.3887E−04 | 5.5120E−04 |

Figure 6A:
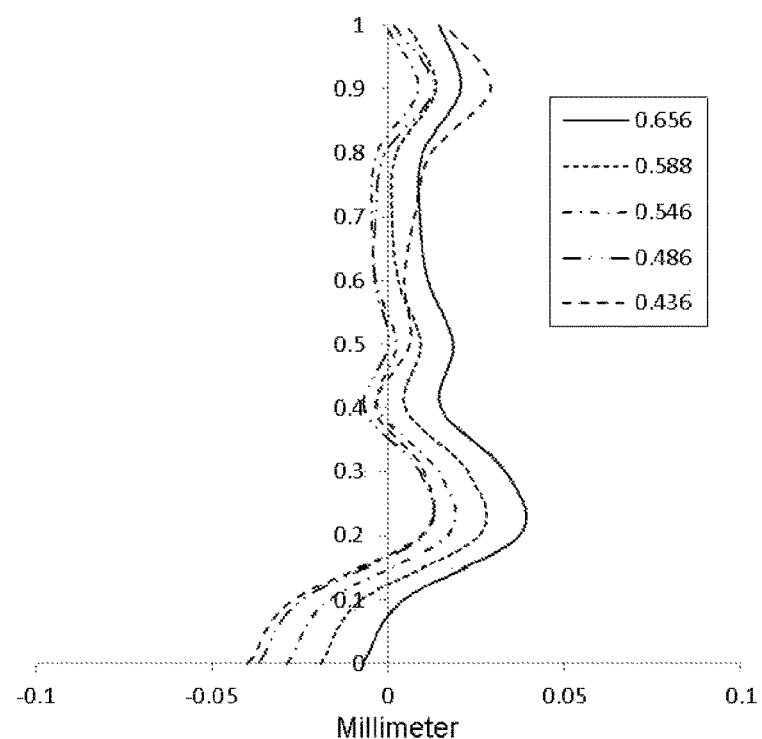
FIGS. 6A to 6D show a longitudinal aberration curve, an astigmatism curve, a distortion curve and a lateral color curve of an optical imaging lens group according to embodiment 3 respectively.
Figure 6B:
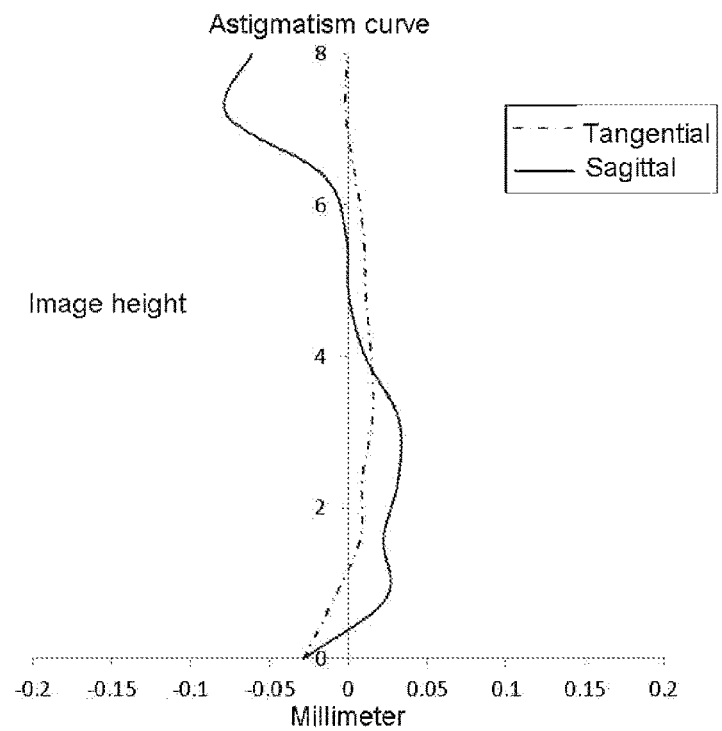
Figure 6C:
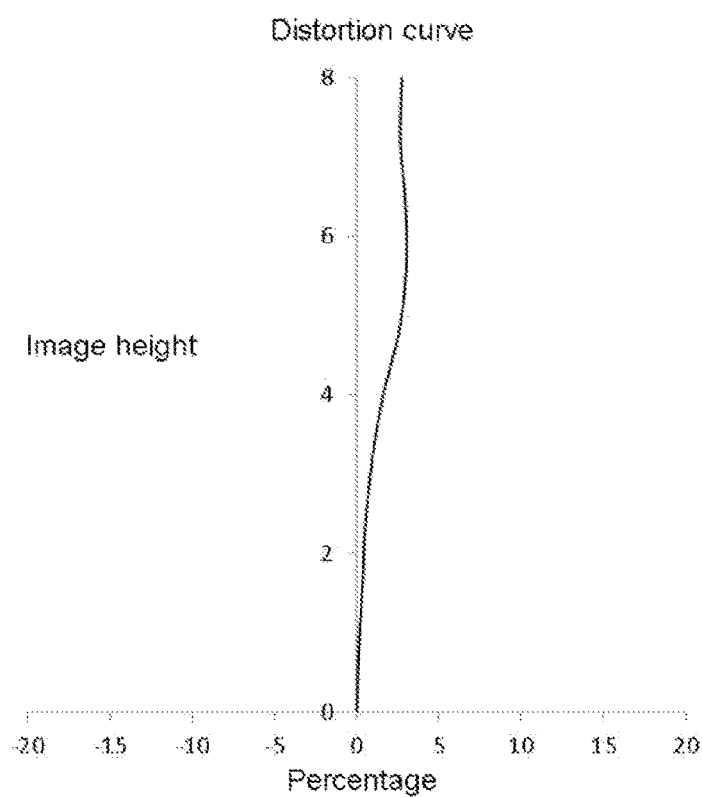
Figure 6D:
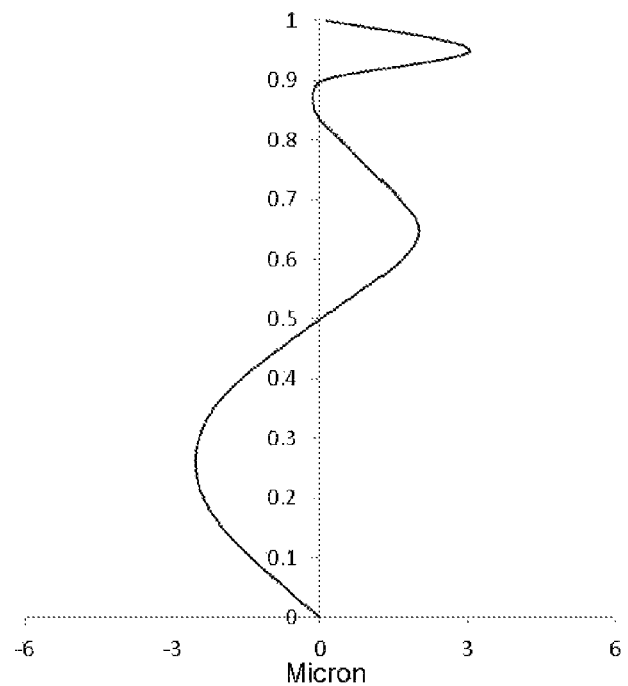

FIG. 6A shows a longitudinal aberration curve of the optical imaging lens assembly according to embodiment 3 to represent deviation of a convergence focal point after light with different wavelengths passes through the lens. FIG. 6B shows an astigmatism curve of the optical imaging lens assembly according to embodiment 3 to represent a tangential image surface curvature and a sagittal image surface curvature. FIG. 6C shows a distortion curve of the optical imaging lens assembly according to embodiment 3 to represent distortion values corresponding to different fields of view. FIG. 6D shows a lateral color curve of the optical imaging lens assembly according to embodiment 3 to represent deviation of different image heights on the imaging surface after the light passes through the lens assembly. According to FIGS. 6A to 6D, it can be seen that the optical imaging lens assembly provided in embodiment 3 may achieve high imaging quality.

Embodiment 4

Figure 7:
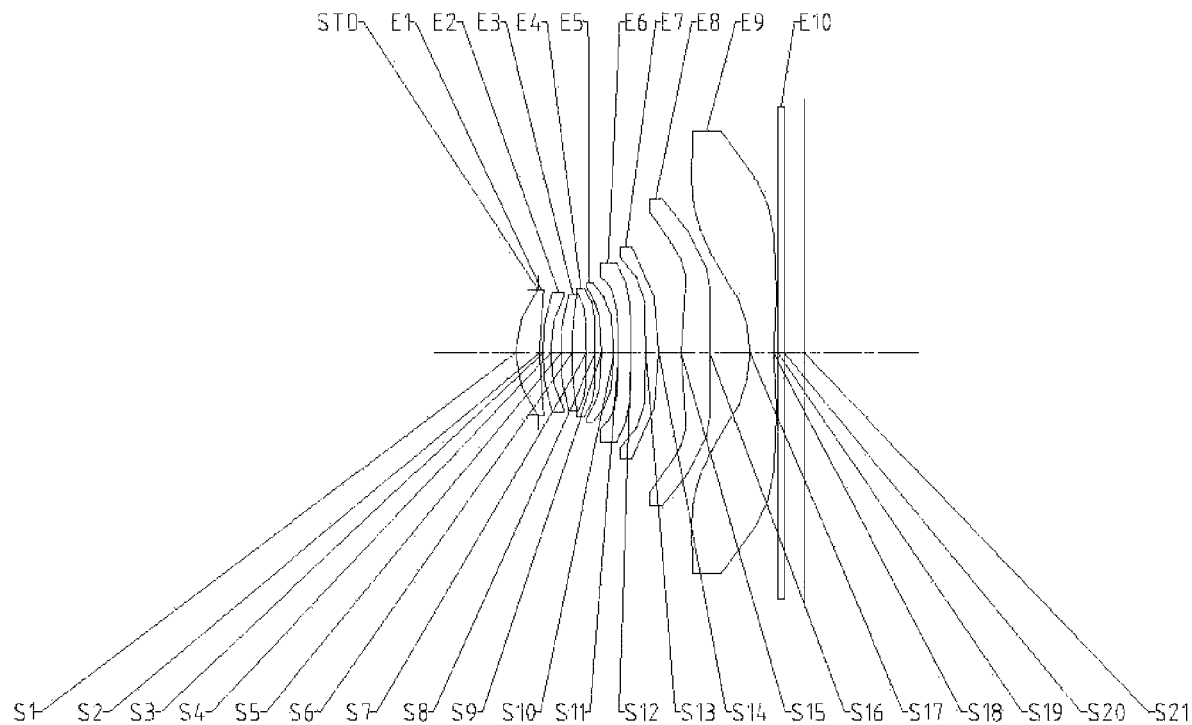
FIG. 7 shows a structure diagram of an optical imaging lens group according to embodiment 4 of the disclosure.

An optical imaging lens assembly according to embodiment 4 of the disclosure is described below with reference to FIGS. 7 to 8D. FIG. 7 is a structure diagram of an optical imaging lens assembly according to embodiment 4 of the disclosure.

As shown in FIG. 7, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, and an optical filter E10.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has positive refractive power, an object-side surface S5 thereof is a convex surface, while an image-side surface S6 is a concave surface. The fourth lens E4 has negative refractive power, an object-side surface S7 thereof is a concave surface, while an image-side surface S8 is a concave surface. The fifth lens E5 has positive refractive power, an object-side surface S9 thereof is a concave surface, while an image-side surface S10 is a convex surface. The sixth lens E6 has negative refractive power, an object-side surface S11 thereof is a concave surface, while an image-side surface S12 is a concave surface. The seventh lens E7 has positive refractive power, an object-side surface S13 thereof is a convex surface, while an image-side surface S14 is a convex surface. The eighth lens E8 has positive refractive power, an object-side surface S15 thereof is a convex surface, while an image-side surface S16 is a concave surface. The ninth lens E9 has negative refractive power, an object-side surface S17 thereof is a concave surface, while an image-side surface S18 is a concave surface. The optical filter E10 has an object-side surface S19 and an image-side surface S20. The optical imaging lens assembly has an imaging surface S21. Light from an object sequentially penetrates through each of the surfaces S1 to S20 and is finally imaged on the imaging surface S21.

In embodiment 4, a value of a total effective focal length f of the optical imaging lens assembly is 7.90 mm. Fno is an f-number of the optical imaging lens assembly, and a value of Fno is 1.98. TTL is an on-axis distance from the object-side surface S1 of the first lens E1 to the imaging surface S21, and a value of TTL is 9.44 mm. ImgH is a half of a diagonal length of an effective pixel region on the imaging surface S21, and a value of ImgH is 8.00 mm. Semi-FOV is a half of a maximum field of view, and a value of Semi-FOV is 44.4°.

Table 10 is a basic parameter table of the optical imaging lens assembly of embodiment 4, and units of the curvature radius, the thickness/distance and the focal length are all millimeter (mm). Tables 11 and Table 12 show high-order coefficients that can be used for each aspheric mirror surface in embodiment 4. A surface type of each aspheric surface may be defined by formula (1) given in embodiment 1.

TABLE 10

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7341 | | | | |
| S1 | Aspheric | 3.0906 | 0.7747 | 1.55 | 56.1 | 7.52 | −0.0321 |
| S2 | Aspheric | 11.3598 | 0.1189 | | | | −3.1934 |
| S3 | Aspheric | 8.3816 | 0.2500 | 1.68 | 19.2 | −20.06 | 1.5320 |
| S4 | Aspheric | 5.1256 | 0.3383 | | | | −0.0397 |
| S5 | Aspheric | 9.4186 | 0.3626 | 1.55 | 56.1 | 49.03 | 12.4417 |
| S6 | Aspheric | 14.3270 | 0.4716 | | | | −36.1574 |
| S7 | Aspheric | −599.9982 | 0.3050 | 1.65 | 23.5 | −422.44 | 0.0000 |
| S8 | Aspheric | 500.0000 | 0.2033 | | | | 0.0000 |
| S9 | Aspheric | −12.4330 | 0.4066 | 1.55 | 56.1 | 46.27 | 0.0000 |
| S10 | Aspheric | −8.4311 | 0.1481 | | | | 0.0000 |
| S11 | Aspheric | −244.2796 | 0.4054 | 1.68 | 19.2 | −28.94 | 0.0000 |
| S12 | Aspheric | 21.3785 | 0.4858 | | | | 0.0000 |
| S13 | Aspheric | 300.6147 | 0.4201 | 1.57 | 37.3 | 32.11 | 0.0000 |
| S14 | Aspheric | −19.5083 | 0.7294 | | | | 0.0000 |
| S15 | Aspheric | 5.8388 | 0.9387 | 1.55 | 56.1 | 11.92 | −1.1770 |
| S16 | Aspheric | 53.2789 | 1.3082 | | | | 0.0000 |
| S17 | Aspheric | −3.8639 | 0.7749 | 1.55 | 56.1 | −5.21 | −1.3473 |
| S18 | Aspheric | 11.5568 | 0.1411 | | | | 0.0000 |
| S19 | Spherical | Infinite | 0.2100 | 1.52/ | 64.2 | | |
| S20 | Spherical | Infinite | 0.6424 | | | | |
| S21 | Spherical | Infinite | | | | | |

TABLE 11

| Surface number | A4 | A6 | A8 | A10 | A12 | A14 | A16 |
|---|---|---|---|---|---|---|---|
| S1 | −1.4223E−02 | −8.3419E−03 | −3.0210E−03 | −6.7284E−04 | −2.1511E−04 | 1.9356E−07 | −1.6463E−05 |
| S2 | −1.5003E−02 | −1.2545E−03 | −1.9784E−03 | 8.7185E−06 | −1.8543E−04 | 3.2094E−05 | 1.4337E−06 |
| S3 | 5.8228E−02 | 8.9513E−03 | −1.4330E−03 | 3.2490E−04 | −1.4217E−04 | 5.6207E−05 | 3.5042E−06 |
| S4 | 8.8238E−02 | 1.0580E−02 | −1.0371E−03 | −3.7685E−04 | −3.3780E−04 | −3.5736E−05 | −9.3380E−06 |
| S5 | −5.5067E−03 | 2.5349E−02 | 5.9919E−03 | 7.1577E−04 | −1.5686E−04 | −5.0106E−05 | −4.9900E−06 |
| S6 | 2.6289E−03 | 2.0171E−02 | 6.8762E−03 | 1.4788E−03 | 3.1143E−04 | 4.4685E−05 | 4.8028E−05 |
| S7 | −2.3752E−01 | −2.4926E−02 | −4.9760E−03 | −2.2115E−03 | −7.3608E−04 | −3.9044E−04 | 1.6783E−05 |
| S8 | −3.4871E−01 | −3.2059E−02 | 2.9314E−03 | 1.6285E−03 | 2.5931E−03 | 1.3799E−03 | 1.3059E−03 |
| S9 | −3.5621E−01 | −1.8606E−02 | 3.1989E−02 | 9.5630E−03 | 5.9161E−03 | 1.2143E−03 | 3.9180E−04 |
| S10 | −3.9478E−01 | −3.9059E−02 | 2.0189E−02 | 3.0903E−03 | 5.6589E−03 | 1.6532E−03 | 1.4794E−03 |
| S11 | −4.9522E−01 | −1.5699E−02 | −2.6434E−03 | −7.0120E−03 | −1.3420E−03 | −8.8405E−04 | 6.2008E−04 |
| S12 | −7.1122E−01 | 5.5792E−02 | −2.1841E−02 | 7.9478E−03 | 2.3247E−03 | 1.2790E−03 | 7.4435E−04 |
| S13 | −8.4806E−01 | −5.6263E−02 | 3.6216E−02 | 1.4261E−02 | 6.2781E−03 | 2.6076E−03 | 4.4913E−04 |
| S14 | −6.9824E−01 | 1.1428E−01 | 2.0961E−02 | −8.3533E−03 | −3.9787E−03 | 3.1865E−03 | 2.8873E−04 |
| S15 | −3.0774E+00 | 3.6940E−01 | 4.5211E−02 | −1.7515E−02 | 3.0095E−04 | 2.5972E−03 | −4.7495E−04 |
| S16 | −1.9830E+00 | 1.6948E−01 | 4.9616E−02 | −4.4005E−02 | 2.9996E−02 | −3.9817E−03 | −2.7651E−04 |
| S17 | 2.8163E+00 | 2.5576E−02 | −2.2703E−01 | 1.2702E−01 | −4.5160E−02 | −5.4873E−03 | 1.7328E−02 |
| S18 | −4.6625E+00 | 6.0206E−01 | −1.3017E−01 | 9.7863E−02 | −6.3409E−02 | −5.8875E−03 | −9.2530E−04 |

TABLE 12

| Surface number | A18 | A20 | A22 | A24 | A26 | A28 | A30 |
|---|---|---|---|---|---|---|---|
| S1 | 1.5898E−06 | −2.8149E−05 | −1.0204E−05 | −1.5014E−05 | −3.5580E−06 | −3.9782E−06 | 1.6735E−06 |
| S2 | 1.5201E−05 | −2.1151E−05 | −1.9876E−05 | −2.2943E−05 | 6.8106E−06 | 5.8788E−06 | 7.5814E−06 |
| S3 | 7.2743E−06 | 5.7022E−06 | −1.0841E−06 | −8.3318E−06 | −4.1331E−06 | 8.0545E−07 | −5.9766E−06 |
| S4 | −1.2473E−05 | −1.2810E−05 | −1.2960E−05 | −5.1977E−06 | −1.7014E−06 | −4.7535E−06 | −2.0408E−06 |
| S5 | −3.0794E−06 | −1.1668E−05 | −8.4795E−06 | −8.3750E−06 | −7.5140E−06 | −5.3349E−06 | −3.4243E−06 |
| S6 | 9.7065E−07 | 8.6182E−06 | −5.6059E−06 | 5.2028E−06 | −5.6545E−06 | −2.3715E−06 | −5.3476E−06 |
| S7 | 1.7469E−05 | 6.3434E−05 | 7.0084E−06 | 4.1884E−06 | −1.1263E−05 | −5.4764E−06 | −2.8091E−06 |
| S8 | 6.5515E−04 | 4.1164E−04 | 9.6076E−05 | 3.7941E−05 | −1.5243E−05 | −3.4520E−06 | −4.7204E−06 |
| S9 | −3.1619E−04 | −2.1319E−04 | −2.4397E−04 | −8.3230E−05 | −3.5496E−05 | −5.2445E−07 | 6.4722E−06 |
| S10 | 1.1562E−04 | 2.9925E−04 | −9.8851E−06 | 1.5306E−04 | 4.7850E−05 | 4.3740E−05 | 9.0525E−06 |
| S11 | −1.5203E−04 | 2.7599E−04 | −2.0687E−05 | 1.8604E−04 | 3.7055E−05 | 4.6625E−05 | 1.0529E−05 |
| S12 | −1.2525E−04 | 2.1179E−04 | −1.5421E−05 | 1.0371E−04 | −1.0638E−04 | −2.2900E−05 | −3.3975E−05 |
| S13 | −5.9835E−04 | −1.0841E−04 | −2.8826E−04 | 2.5714E−05 | 1.5065E−05 | 2.6143E−05 | −2.7343E−06 |
| S14 | −5.0247E−04 | 1.5306E−04 | −2.0139E−04 | 8.0796E−05 | 4.4283E−05 | 4.6494E−05 | 1.2538E−05 |
| S15 | −1.1422E−03 | 4.8422E−04 | 2.0392E−04 | −5.2699E−05 | −2.0899E−05 | 1.1314E−05 | −6.4980E−06 |
| S16 | −2.6020E−03 | 5.2091E−04 | 5.8239E−05 | 2.6140E−04 | 1.8333E−04 | −4.1922E−06 | −6.3593E−05 |
| S17 | −1.2663E−02 | 4.2192E−03 | −8.0305E−04 | 8.4366E−05 | 3.6483E−04 | −5.3815E−04 | 2.3911E−04 |
| S18 | −2.3410E−04 | 2.3851E−03 | −7.9620E−04 | −2.2083E−03 | −1.1692E−03 | 6.4196E−05 | 8.0236E−04 |

Figure 8A:
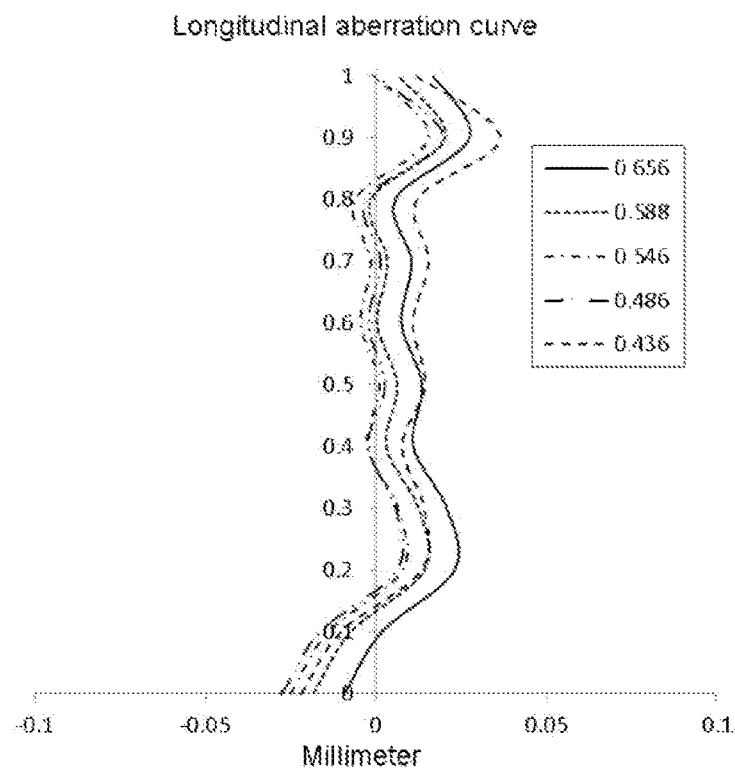
FIGS. 8A to 8D show a longitudinal aberration curve, an astigmatism curve, a distortion curve and a lateral color curve of an optical imaging lens group according to embodiment 4 respectively.
Figure 8B:
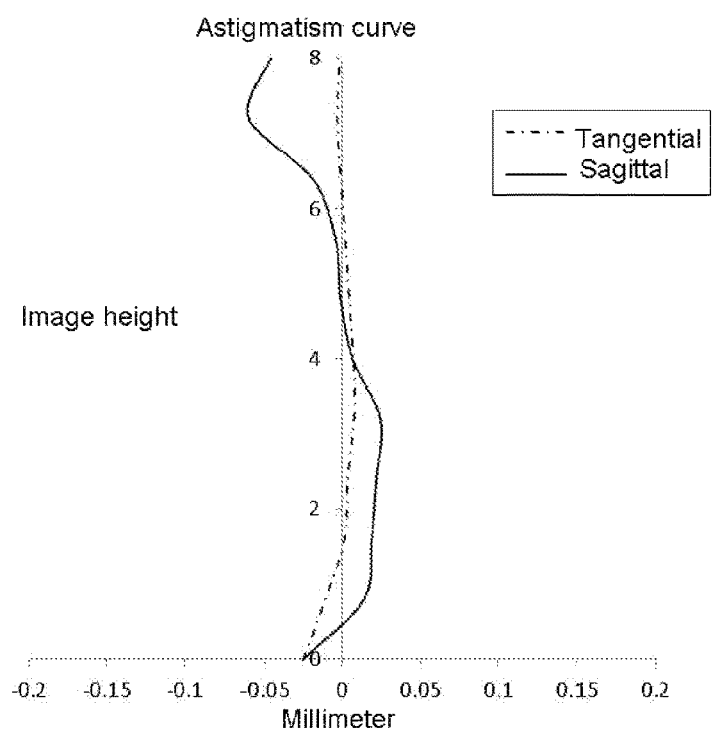
Figure 8C:
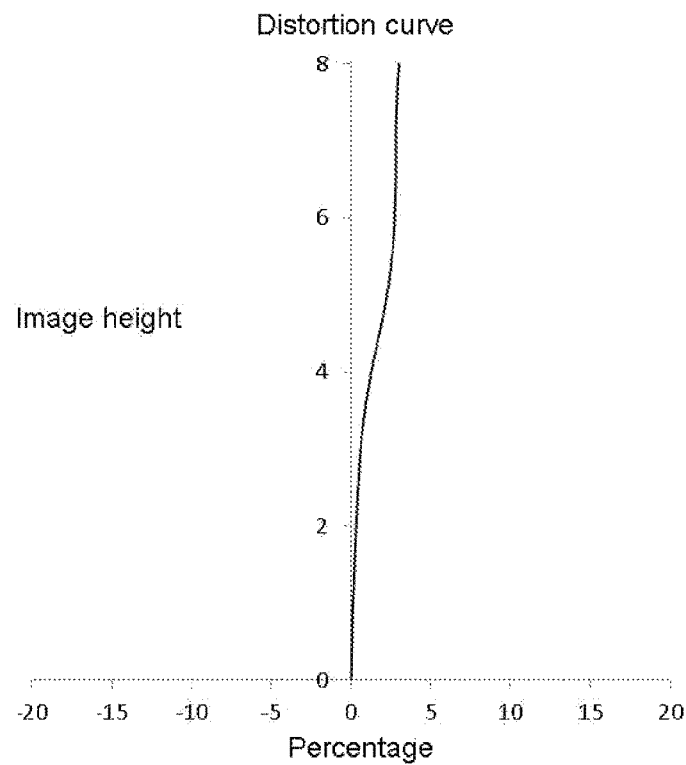
Figure 8D:
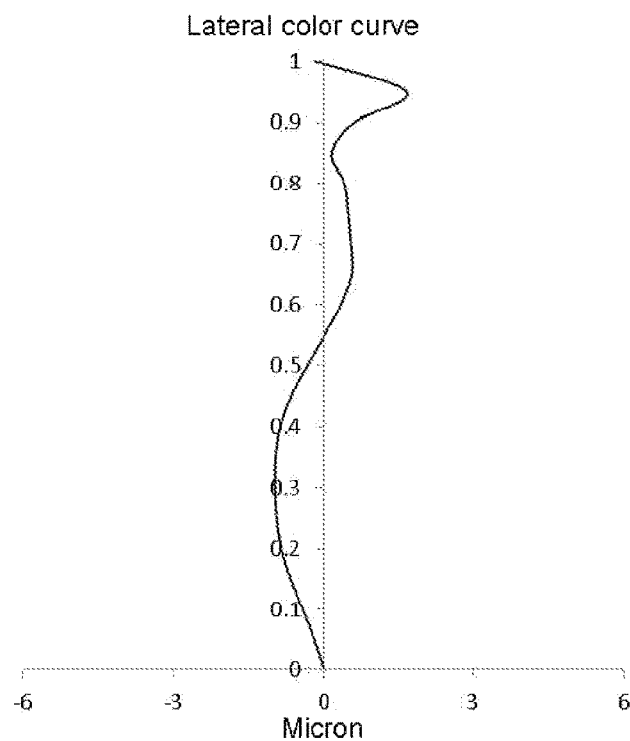

FIG. 8A shows a longitudinal aberration curve of the optical imaging lens assembly according to embodiment 4 to represent deviation of a convergence focal point after light with different wavelengths passes through the lens. FIG. 8B shows an astigmatism curve of the optical imaging lens assembly according to embodiment 4 to represent a tangential image surface curvature and a sagittal image surface curvature. FIG. 8C shows a distortion curve of the optical imaging lens assembly according to embodiment 4 to represent distortion values corresponding to different fields of view. FIG. 8D shows a lateral color curve of the optical imaging lens assembly according to embodiment 4 to represent deviation of different image heights on the imaging surface after the light passes through the lens assembly. According to FIGS. 8A to 8D, it can be seen that the optical imaging lens assembly provided in embodiment 4 may achieve high imaging quality.

Embodiment 5

Figure 9:
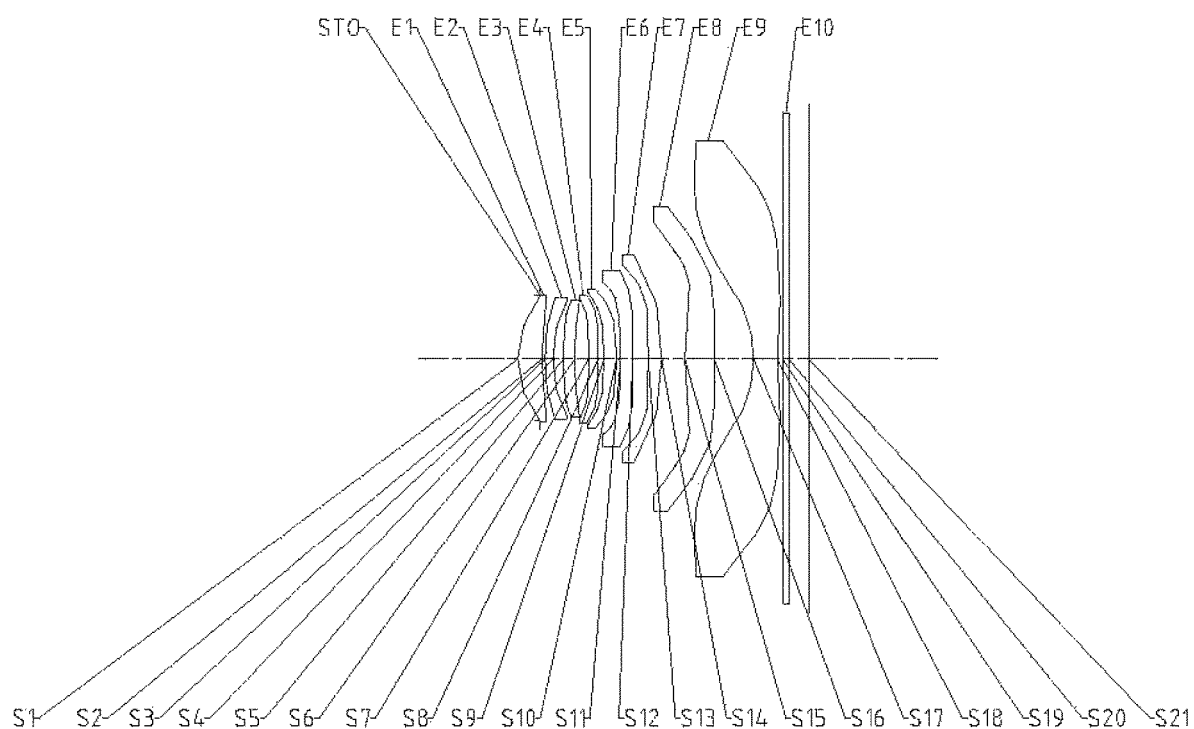
FIG. 9 shows a structure diagram of an optical imaging lens group according to embodiment 5 of the disclosure.

An optical imaging lens assembly according to embodiment 5 of the disclosure is described below with reference to FIGS. 9 to 10D. FIG. 9 shows a structure diagram of an optical imaging lens assembly according to embodiment 5 of the disclosure.

As shown in FIG. 9, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, and an optical filter E10.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has positive refractive power, an object-side surface S5 thereof is a convex surface, while an image-side surface S6 is a concave surface. The fourth lens E4 has negative refractive power, an object-side surface S7 thereof is a concave surface, while an image-side surface S8 is a concave surface. The fifth lens E5 has positive refractive power, an object-side surface S9 thereof is a concave surface, while an image-side surface S10 is a convex surface. The sixth lens E6 has negative refractive power, an object-side surface S11 thereof is a convex surface, while an image-side surface S12 is a concave surface. The seventh lens E7 has positive refractive power, an object-side surface S13 thereof is a concave surface, while an image-side surface S14 is a convex surface. The eighth lens E8 has positive refractive power, an object-side surface S15 thereof is a convex surface, while an image-side surface S16 is a concave surface. The ninth lens E9 has negative refractive power, an object-side surface S17 thereof is a concave surface, while an image-side surface S18 is a concave surface. The optical filter E10 has an object-side surface S19 and an image-side surface S20. The optical imaging lens assembly has an imaging surface S21. Light from an object sequentially penetrates through each of the surfaces S1 to S20 and is finally imaged on the imaging surface S21.

In embodiment 5, a value of a total effective focal length f of the optical imaging lens assembly is 7.95 mm. Fno is an f-number of the optical imaging lens assembly, and a value of Fno is 1.98. TTL is an on-axis distance from the object-side surface S1 of the first lens E1 to the imaging surface S21, and a value of TTL is 9.50 mm. ImgH is a half of a diagonal length of an effective pixel region on the imaging surface S21, and a value of ImgH is 8.00 mm. Semi-FOV is a half of a maximum field of view, and a value of Semi-FOV is 44.2°.

Table 13 shows a basic parameter table of the optical imaging lens assembly of embodiment 5, and units of the curvature radius, the thickness/distance and the focal length are all millimeter (mm). Tables 14 and Table 15 show high-order coefficients that can be used for each aspheric mirror surface in embodiment 5. A surface type of each aspheric surface may be defined by formula (1) given in embodiment 1.

TABLE 13

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7341 | | | | |
| S1 | Aspheric | 3.0844 | 0.7828 | 1.55 | 56.1 | 7.49 | −0.0336 |
| S2 | Aspheric | 11.3795 | 0.1135 | | | | −2.8098 |
| S3 | Aspheric | 8.3226 | 0.2576 | 1.68 | 19.2 | −20.12 | 1.3585 |
| S4 | Aspheric | 5.1073 | 0.3277 | | | | 0.0130 |
| S5 | Aspheric | 9.4862 | 0.3719 | 1.55 | 56.1 | 50.86 | 12.5628 |
| S6 | Aspheric | 14.2015 | 0.4742 | | | | −32.9622 |
| S7 | Aspheric | −500.0000 | 0.3060 | 1.65 | 23.5 | −370.59 | 0.0000 |
| S8 | Aspheric | 458.7928 | 0.2005 | | | | 0.0000 |
| S9 | Aspheric | −12.5500 | 0.4040 | 1.55 | 56.1 | 49.60 | 0.0000 |
| S10 | Aspheric | −8.6759 | 0.1267 | | | | 0.0000 |
| S11 | Aspheric | 139.7340 | 0.4010 | 1.68 | 19.2 | −30.94 | 0.0000 |
| S12 | Aspheric | 18.2374 | 0.5065 | | | | 0.0000 |
| S13 | Aspheric | −459.8203 | 0.4231 | 1.57 | 37.3 | 30.90 | 0.0000 |
| S14 | Aspheric | −16.9926 | 0.7674 | | | | 0.0000 |
| S15 | Aspheric | 6.1228 | 0.9522 | 1.55 | 56.1 | 12.45 | −1.2226 |
| S16 | Aspheric | 57.8942 | 1.2901 | | | | 0.0000 |
| S17 | Aspheric | −3.8595 | 0.7699 | 1.55 | 56.1 | −5.23 | −1.3440 |
| S18 | Aspheric | 11.7579 | 0.1710 | | | | 0.0000 |
| S19 | Spherical | Infinite | 0.2100 | 1.52 | 64.2 | | |
| S20 | Spherical | Infinite | 0.6424 | | | | |
| S21 | Spherical | Infinite | | | | | |

TABLE 14

| Surface number | A4 | A6 | A8 | A10 | A12 | A14 | A16 |
|---|---|---|---|---|---|---|---|
| S1 | −1.5853E−02 | −9.2050E−03 | −3.3317E−03 | −7.4074E−04 | −2.5473E−04 | −1.3772E−05 | −4.0650E−05 |
| S2 | −1.6872E−02 | −2.3263E−03 | −2.1511E−03 | −2.6103E−04 | −1.6374E−04 | −6.3967E−05 | −1.9036E−05 |
| S3 | 6.4403E−02 | 9.9613E−03 | −1.6895E−03 | 1.6311E−04 | −1.7295E−04 | −4.9993E−05 | −6.3804E−05 |
| S4 | 9.6655E−02 | 1.1183E−02 | −1.2372E−03 | −8.2969E−04 | −4.3494E−04 | −1.7585E−04 | −4.8404E−05 |
| S5 | −2.5321E−03 | 2.7800E−02 | 6.3824E−03 | 6.9901E−04 | −2.5061E−04 | −9.7022E−05 | −5.1477E−05 |
| S6 | 3.6298E−03 | 2.0267E−02 | 6.8854E−03 | 1.4801E−03 | 3.4063E−04 | 4.2215E−05 | 4.1311E−05 |
| S7 | −2.3247E−01 | −2.4649E−02 | −4.7584E−03 | −2.0323E−03 | −6.1062E−04 | −3.4464E−04 | −5.0431E−06 |
| S8 | −3.3711E−01 | −3.2090E−02 | 2.1684E−03 | 8.9218E−04 | 1.7981E−03 | 6.2914E−04 | 6.7146E−04 |
| S9 | −3.3615E−01 | −2.6080E−02 | 2.4331E−02 | 5.8028E−03 | 3.9466E−03 | 5.7014E−04 | 2.3379E−04 |
| S10 | −3.8056E−01 | −4.0599E−02 | 1.6747E−02 | 1.0098E−03 | 3.7810E−03 | 7.4207E−04 | 1.0232E−03 |
| S11 | −4.8865E−01 | −1.3175E−02 | −2.4652E−02 | −6.3648E−03 | −1.4172E−03 | −9.8943E−04 | 5.5543E−04 |
| S12 | −6.9198E−01 | 5.3602E−02 | −2.1357E−02 | 6.8726E−03 | 1.7978E−03 | 1.0319E−03 | 7.0244E−04 |
| S13 | −8.3571E−01 | 5.9321E−01 | 3.2075E−01 | −5.9071E−02 | −1.7152E−01 | −1.3681E−01 | −6.6468E−02 |
| S14 | −7.0685E−01 | 1.1867E−01 | 2.0002E−02 | −9.8163E−03 | −3.9814E−03 | 3.3891E−03 | −5.4047E−05 |
| S15 | −3.8772E+00 | 1.6912E+00 | 5.7663E−01 | 3.9940E−01 | 3.3968E−01 | 2.1238E−01 | 1.1404E−01 |
| S16 | −2.0103E+00 | 2.0574E−01 | 4.7795E−02 | −4.3260E−02 | 3.1040E−02 | −3.6964E−03 | −8.1544E−04 |
| S17 | 2.6680E+00 | 6.4876E−02 | −2.3188E−01 | 1.2150E−01 | −3.7359E−02 | −1.0675E−02 | 1.9030E−02 |
| S18 | −4.5784E+00 | 5.8961E−01 | −1.2740E−01 | 1.0253E−01 | −5.6864E−02 | −4.3897E−03 | −2.6631E−03 |

TABLE 15

| Surface number | A18 | A20 | A22 | A24 | A26 | A28 | A30 |
|---|---|---|---|---|---|---|---|
| S1 | −1.5103E−05 | −4.4137E−05 | −1.7768E−05 | −1.8766E−05 | −8.8460E−06 | −9.1395E−06 | −2.9480E−06 |
| S2 | −5.0389E−05 | −2.4980E−05 | −2.8689E−05 | 1.0813E−07 | 1.6928E−05 | 2.2282E−05 | 9.4021E−06 |
| S3 | −5.8728E−05 | −3.4958E−05 | −4.1672E−05 | −3.1541E−05 | −2.1313E−05 | −8.0211E−06 | −6.3920E−06 |
| S4 | −6.6515E−05 | −2.4369E−05 | −3.3778E−05 | −8.4082E−06 | −1.0292E−05 | −9.8556E−07 | −4.1769E−06 |
| S5 | −1.6403E−05 | −2.8737E−05 | −1.7682E−05 | −1.9227E−05 | −1.0849E−05 | −8.9598E−06 | −3.7097E−06 |
| S6 | −2.4879E−06 | 1.1228E−05 | −3.1921E−06 | 6.3274E−06 | −4.3981E−06 | −2.3173E−06 | −6.6731E−06 |
| S7 | 8.5674E−06 | 5.4881E−05 | 1.3476E−05 | 9.6661E−06 | −5.3869E−06 | −5.6128E−06 | −4.2517E−06 |
| S8 | 2.9220E−04 | 2.3195E−04 | 4.7711E−05 | 2.6624E−05 | −5.6179E−06 | −1.1134E−06 | −4.7598E−06 |
| S9 | −2.2304E−04 | −8.5372E−05 | −1.1832E−04 | −3.1259E−05 | 3.0501E−06 | 1.4975E−05 | 7.4529E−06 |
| S10 | −1.4869E−04 | 3.5675E−05 | −1.4845E−04 | −1.3696E−05 | −1.2837E−05 | 1.2414E−05 | 5.2289E−06 |
| S11 | −2.4393E−04 | 1.3784E−04 | −5.6863E−05 | 6.9952E−05 | 1.3788E−05 | 2.2371E−05 | 5.3271E−06 |
| S12 | −4.5019E−05 | 2.0663E−04 | 7.8833E−05 | 1.0503E−04 | 2.2118E−07 | 3.5511E−06 | −5.0251E−06 |
| S13 | −1.9353E−02 | −2.5953E−03 | −4.5780E−05 | 3.1486E−06 | −1.1346E−04 | 3.7162E−05 | 2.3831E−05 |
| S14 | −4.6956E−04 | −1.9152E−05 | −7.7357E−05 | 1.0347E−04 | 8.2156E−05 | 4.5363E−05 | 1.4584E−05 |
| S15 | 5.1625E−02 | 1.3475E−02 | −3.3084E−04 | −1.6302E−04 | 1.9377E−04 | −1.2679E−04 | −8.3000E−05 |
| S16 | −1.4358E−03 | 1.2038E−03 | 3.2330E−04 | −5.1249E−05 | −7.7304E−05 | −6.9466E−05 | −2.4233E−05 |
| S17 | −1.1263E−02 | 2.8425E−03 | −1.9263E−04 | −3.7537E−05 | 8.5168E−05 | −1.0591E−04 | 2.6925E−05 |
| S18 | −2.2306E−03 | 1.5145E−03 | 7.2810E−04 | −7.6806E−04 | −6.8416E−04 | −3.7162E−04 | 3.0650E−04 |

Figure 10A:
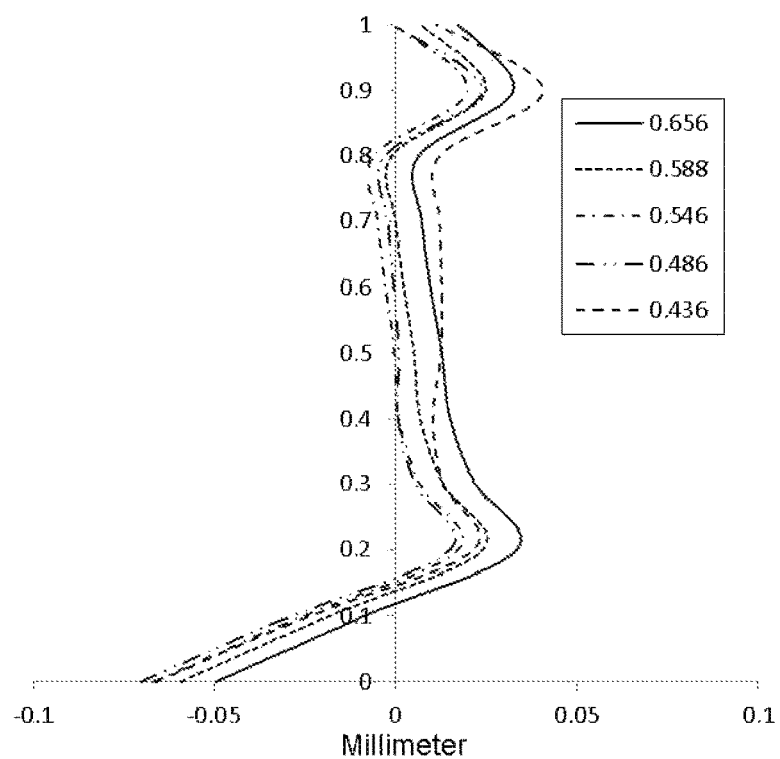
FIGS. 10A to 10D show a longitudinal aberration curve, an astigmatism curve, a distortion curve and a lateral color curve of an optical imaging lens group according to embodiment 5 respectively.
Figure 10B:
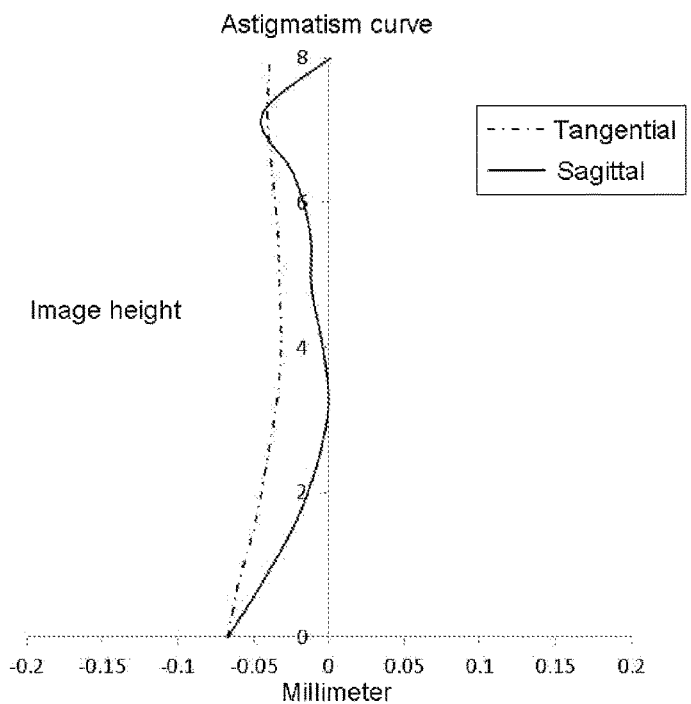
Figure 10C:
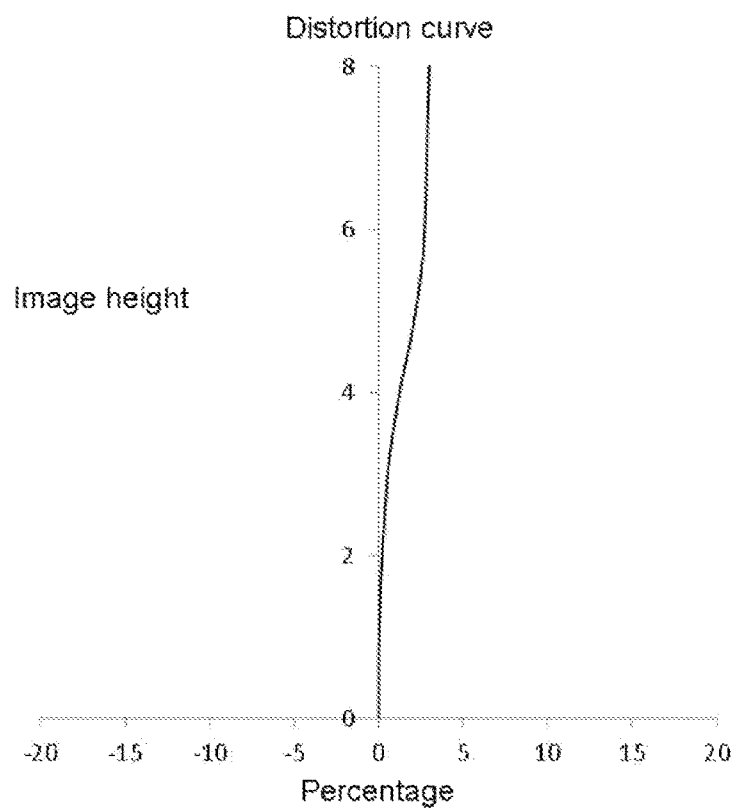
Figure 10D:
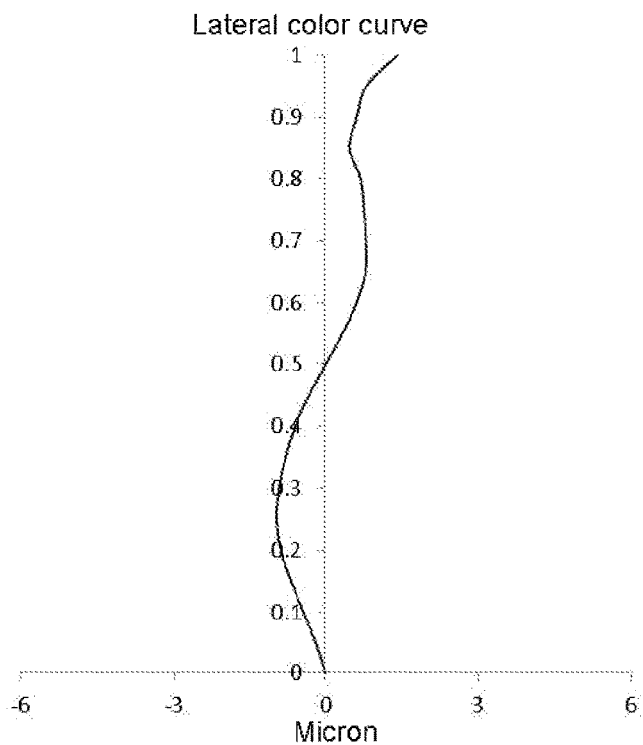

FIG. 10A shows a longitudinal aberration curve of the optical imaging lens assembly according to embodiment 5 to represent deviation of a convergence focal point after light with different wavelengths passes through the lens. FIG. 10B shows an astigmatism curve of the optical imaging lens assembly according to embodiment 5 to represent a tangential image surface curvature and a sagittal image surface curvature. FIG. 10C shows a distortion curve of the optical imaging lens assembly according to embodiment 5 to represent distortion values corresponding to different fields of view. FIG. 10D shows a lateral color curve of the optical imaging lens assembly according to embodiment 5 to represent deviation of different image heights on the imaging surface after the light passes through the lens assembly. According to FIGS. 10A to 10D, it can be seen that the optical imaging lens assembly provided in embodiment 5 may achieve high imaging quality.

Embodiment 6

Figure 11:
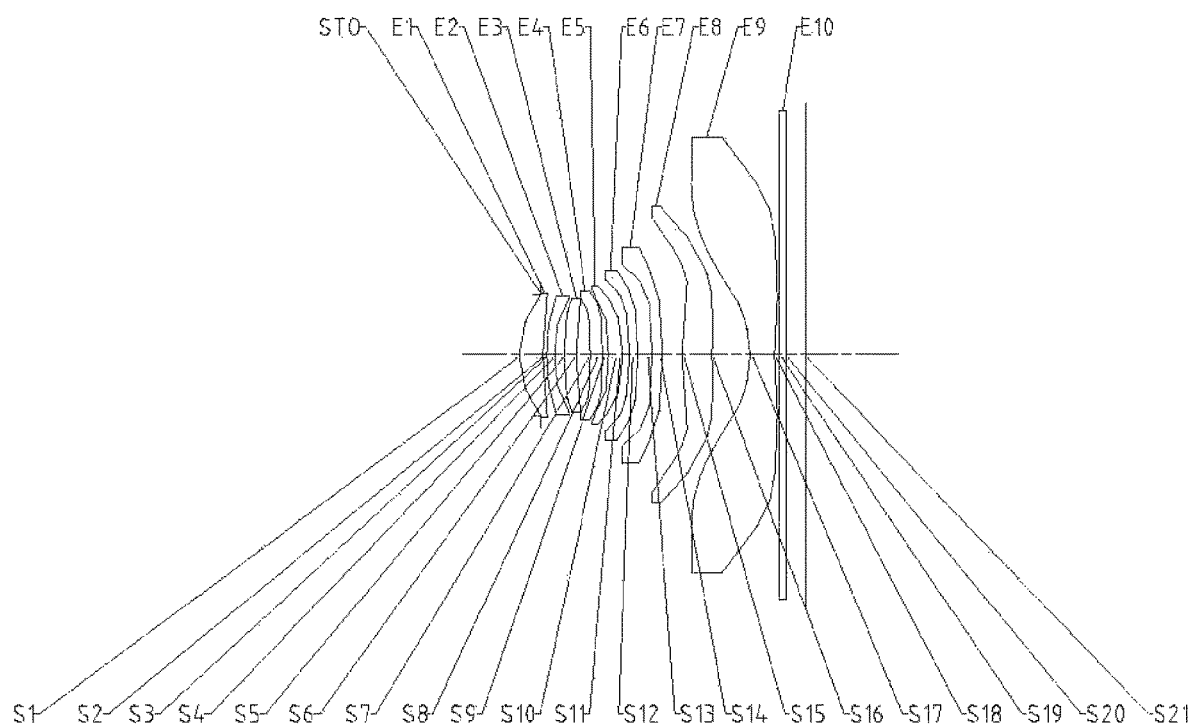
FIG. 11 shows a structure diagram of an optical imaging lens group according to embodiment 6 of the disclosure.

An optical imaging lens assembly according to embodiment 6 of the disclosure is described below with reference to FIGS. 11 to 12D. FIG. 11 is a structure diagram of an optical imaging lens assembly according to embodiment 6 of the disclosure.

As shown in FIG. 11, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, and an optical filter E10.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has positive refractive power, an object-side surface S5 thereof is a convex surface, while an image-side surface S6 is a concave surface. The fourth lens E4 has negative refractive power, an object-side surface S7 thereof is a concave surface, while an image-side surface S8 is a concave surface. The fifth lens E5 has positive refractive power, an object-side surface S9 thereof is a concave surface, while an image-side surface S10 is a convex surface. The sixth lens E6 has negative refractive power, an object-side surface S11 thereof is a concave surface, while an image-side surface S12 is a convex surface. The seventh lens E7 has negative refractive power, an object-side surface S13 thereof is a concave surface, while an image-side surface S14 is a convex surface. The eighth lens E8 has positive refractive power, an object-side surface S15 thereof is a convex surface, while an image-side surface S16 is a convex surface. The ninth lens E9 has negative refractive power, an object-side surface S17 thereof is a concave surface, while an image-side surface S18 is a concave surface. The optical filter E10 has an object-side surface S19 and an image-side surface S20. The optical imaging lens assembly has an imaging surface S21. Light from an object sequentially penetrates through each of the surfaces S1 to S20 and is finally imaged on the imaging surface S21.

In embodiment 6, a value of a total effective focal length f of the optical imaging lens assembly is 7.85 mm. Fno is an f-number of the optical imaging lens assembly, and a value of Fno is 1.98. TTL is an on-axis distance from the object-side surface S1 of the first lens E1 to the imaging surface S21, and a value of TTL is 9.35 mm. ImgH is a half of a diagonal length of an effective pixel region on the imaging surface S21, and a value of ImgH is 8.00 mm. Semi-FOV is a half of a maximum field of view, and a value of Semi-FOV is 44.7°.

Table 16 shows a basic parameter table of the optical imaging lens assembly of embodiment 6, and units of the curvature radius, the thickness/distance and the focal length are all millimeter (mm). Tables 17 and Table 18 show high-order coefficients that can be used for each aspheric mirror surface in embodiment 6. A surface type of each aspheric surface may be defined by formula (1) given in embodiment 1.

TABLE 16

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7341 | | | | |
| S1 | Aspheric | 3.0908 | 0.7728 | 1.55 | 56.1 | 7.39 | −0.0544 |
| S2 | Aspheric | 12.0310 | 0.1243 | | | | −3.5916 |
| S3 | Aspheric | 8.4534 | 0.2511 | 1.68 | 19.2 | −18.68 | 1.1463 |
| S4 | Aspheric | 5.0118 | 0.3229 | | | | −0.1549 |
| S5 | Aspheric | 9.3900 | 0.3795 | 1.55 | 56.1 | 44.38 | 12.2523 |
| S6 | Aspheric | 15.1023 | 0.4718 | | | | −53.4214 |
| S7 | Aspheric | −175.7396 | 0.4028 | 1.65 | 23.5 | −139.51 | 0.0000 |
| S8 | Aspheric | 184.8790 | 0.1958 | | | | 0.0000 |
| S9 | Aspheric | −10.0735 | 0.4650 | 1.55 | 56.1 | 27.19 | 0.0000 |
| S10 | Aspheric | −6.1016 | 0.2210 | | | | 0.0000 |
| S11 | Aspheric | −26.2598 | 0.2798 | 1.68 | 19.2 | −282.35 | 0.0000 |
| S12 | Aspheric | −30.5595 | 0.4692 | | | | 0.0000 |
| S13 | Aspheric | −20.9884 | 0.3200 | 1.57 | 37.3 | −50.22 | 0.0000 |
| S14 | Aspheric | −78.8257 | 0.6461 | | | | 0.0000 |
| S15 | Aspheric | 5.7936 | 0.9853 | 1.55 | 56.1 | 10.48 | −1.1447 |
| S16 | Aspheric | −455.1249 | 1.2305 | | | | 0.0000 |
| S17 | Aspheric | −3.8611 | 0.8087 | 1.55 | 56.1 | −5.20 | −1.3494 |
| S18 | Aspheric | 11.5909 | 0.1536 | | | | 0.0000 |
| S19 | Spherical | Infinite | 0.2100 | 1.52 | 64.2 | | |
| S20 | Spherical | Infinite | 0.6424 | | | | |
| S21 | Spherical | Infinite | | | | | |

TABLE 17

| Surface number | A4 | A6 | A8 | A10 | A12 | A14 | A16 |
|---|---|---|---|---|---|---|---|
| S1 | −1.7332E−02 | −9.3280E−03 | −3.3353E−03 | −7.9467E−04 | −3.3012E−04 | −4.0785E−05 | −3.4873E−05 |
| S2 | −1.6560E−02 | −3.2856E−03 | −1.8716E−03 | −4.9223E−04 | −1.8612E−04 | 1.0336E−05 | 2.6747E−05 |
| S3 | 6.0168E−02 | 7.7758E−03 | −1.1379E−03 | −3.4214E−04 | 2.3227E−05 | 8.7001E−05 | 2.1298E−05 |
| S4 | 9.1126E−02 | 1.1832E−02 | −5.4374E−03 | −8.8172E−04 | −4.0767E−04 | 1.9226E−05 | 5.7439E−05 |
| S5 | −5.6167E−03 | 2.8623E−02 | 7.6358E−03 | 6.9720E−04 | −4.0819E−04 | −9.1441E−05 | 1.8805E−05 |
| S6 | −2.1583E−04 | 2.0648E−02 | 7.9921E−03 | 1.6226E−03 | 2.6937E−04 | −2.8441E−05 | 4.1154E−05 |
| S7 | −2.5411E−01 | −2.1402E−02 | −4.2067E−03 | −2.0895E−03 | −7.1227E−04 | −3.8405E−04 | −1.0570E−05 |
| S8 | −3.5740E−01 | −3.0650E−02 | 1.8103E−03 | −8.8276E−04 | 6.7331E−04 | 8.5410E−05 | 5.5174E−04 |
| S9 | −3.3482E−01 | −2.7274E−02 | 2.4724E−02 | 6.7779E−03 | 4.4282E−03 | 1.0399E−03 | 8.5395E−04 |
| S10 | −3.8750E−01 | −3.0441E−02 | 1.5808E−02 | 4.1374E−03 | 4.9799E−03 | 1.4581E−03 | 1.6056E−03 |
| S11 | −5.1109E−01 | −8.3821E−03 | −2.4267E−02 | −8.5042E−03 | −1.8414E−03 | −8.3373E−04 | 1.1475E−03 |
| S12 | −6.8375E−01 | 3.3668E−02 | −2.1820E−02 | 7.1039E−03 | 6.0944E−03 | 1.3652E−03 | −5.9881E−04 |
| S13 | −7.7296E−01 | −9.7656E−02 | 3.5810E−02 | 8.3113E−03 | 6.5554E−03 | 4.6461E−03 | 1.6663E−03 |
| S14 | −7.3580E−01 | 9.1158E−02 | 1.6580E−02 | −8.5480E−03 | −2.8569E−03 | 2.8131E−03 | −1.0386E−04 |
| S15 | −2.9819E+00 | 3.4902E−01 | 4.3500E−02 | −1.5102E−02 | −3.8654E−04 | 2.8810E−03 | −2.2132E−04 |
| S16 | −1.9906E+00 | 1.6308E−01 | 6.1413E−02 | −3.8507E−02 | 4.0598E−02 | −5.9234E−03 | −2.9280E−03 |
| S17 | 2.7882E+00 | 4.1648E−02 | −2.3302E−01 | 1.2307E−01 | −4.1843E−02 | −7.8946E−03 | 1.5919E−02 |
| S18 | −4.5532E+00 | 5.5996E−01 | −9.2475E−02 | 1.0099E−01 | −6.2816E−02 | −6.3958E−03 | 2.6408E−03 |

TABLE 18

| Surface number | A18 | A20 | A22 | A24 | A26 | A28 | A30 |
|---|---|---|---|---|---|---|---|
| S1 | 7.8919E−06 | −3.6906E−05 | −2.0148E−05 | −2.1765E−05 | −3.0605E−06 | −4.8457E−06 | −4.6909E−07 |
| S2 | −6.1763E−07 | −2.5922E−05 | −2.8503E−05 | −1.9825E−05 | 1.0633E−05 | 4.5086E−06 | 5.6172E−06 |
| S3 | −7.9461E−05 | −7.0624E−05 | −8.2444E−05 | −5.2539E−05 | −3.2877E−05 | −1.9326E−05 | −2.1573E−05 |
| S4 | −3.6830E−06 | −2.6876E−05 | −3.1318E−05 | −1.9111E−05 | −5.7193E−06 | −8.7802E−06 | 5.4476E−08 |
| S5 | 2.4527E−05 | −1.7679E−05 | −6.4038E−06 | −3.7501E−06 | −2.8981E−06 | −2.0201E−06 | 4.9887E−07 |
| S6 | −1.2947E−06 | 2.2381E−05 | −6.3630E−06 | 8.6777E−06 | −8.4997E−06 | −2.8980E−06 | −1.1377E−05 |
| S7 | −3.1045E−05 | 1.8541E−05 | −2.4247E−05 | −1.5552E−05 | −2.3238E−05 | −1.4881E−05 | −9.0251E−06 |
| S8 | 1.6981E−04 | 1.7706E−04 | −9.4731E−06 | 1.3117E−05 | −6.9610E−06 | 8.8451E−07 | −4.1487E−06 |
| S9 | −6.7348E−05 | −6.5783E−05 | −2.2297E−04 | −5.8145E−05 | 2.7673E−06 | 1.2304E−05 | 5.0549E−06 |
| S10 | 2.0689E−04 | 3.5482E−04 | −4.2276E−05 | 9.0524E−05 | 3.7940E−05 | 4.1647E−05 | 1.0574E−05 |
| S11 | −7.2348E−05 | 3.4244E−04 | −1.4380E−04 | 1.1583E−04 | 1.5870E−05 | 2.3267E−05 | 1.6179E−05 |
| S12 | −8.0035E−04 | 1.2111E−03 | 7.1104E−04 | 4.0731E−04 | −2.2959E−04 | −3.1882E−05 | −4.3284E−05 |
| S13 | −5.1079E−04 | −1.7577E−04 | 1.5609E−04 | 6.1009E−04 | 1.8150E−04 | 2.6459E−05 | −4.2512E−05 |

TABLE 18-continued

| Surface number | A18 | A20 | A22 | A24 | A26 | A28 | A30 |
|---|---|---|---|---|---|---|---|
| S14 | −4.1565E−04 | 1.1651E−04 | 1.0173E−04 | 9.7139E−05 | −1.3237E−04 | 1.5012E−06 | 2.0107E−05 |
| S15 | −1.0581E−03 | 3.5412E−04 | 1.7195E−04 | −4.5662E−05 | −2.4098E−05 | 3.1108E−06 | −2.5581E−06 |
| S16 | −2.8036E−03 | 3.9003E−04 | −8.7211E−04 | −1.6396E−04 | 9.0139E−05 | −7.4800E−05 | −1.0908E−04 |
| S17 | −1.3204E−02 | 3.5774E−03 | −8.0791E−04 | −4.1931E−04 | −4.9313E−04 | 2.9711E−04 | −5.0414E−04 |
| S18 | −1.7512E−03 | 1.9491E−03 | −1.7732E−03 | −3.8856E−04 | −1.6185E−03 | 3.6767E−04 | −4.2249E−05 |

Figure 12A:
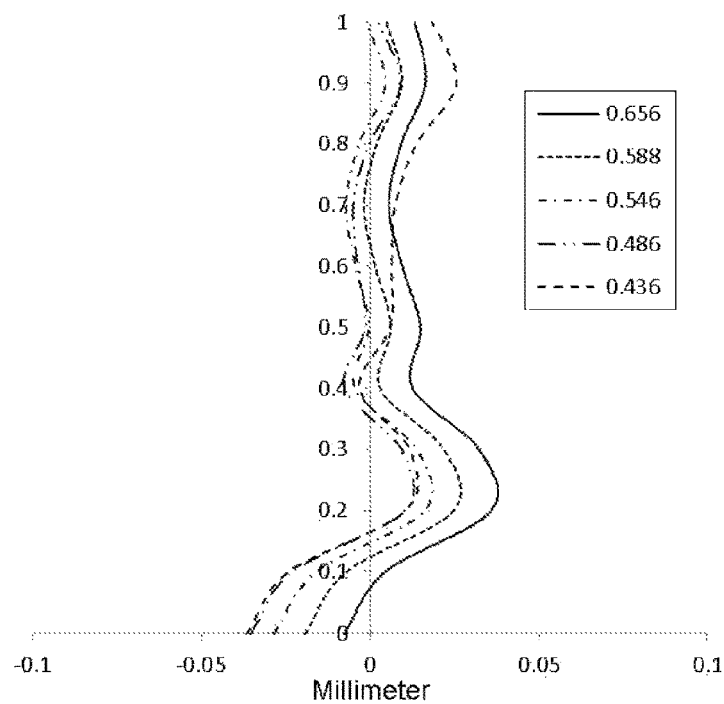
FIGS. 12A to 12D show a longitudinal aberration curve, an astigmatism curve, a distortion curve and a lateral color curve of an optical imaging lens group according to embodiment 6 respectively.
Figure 12B:
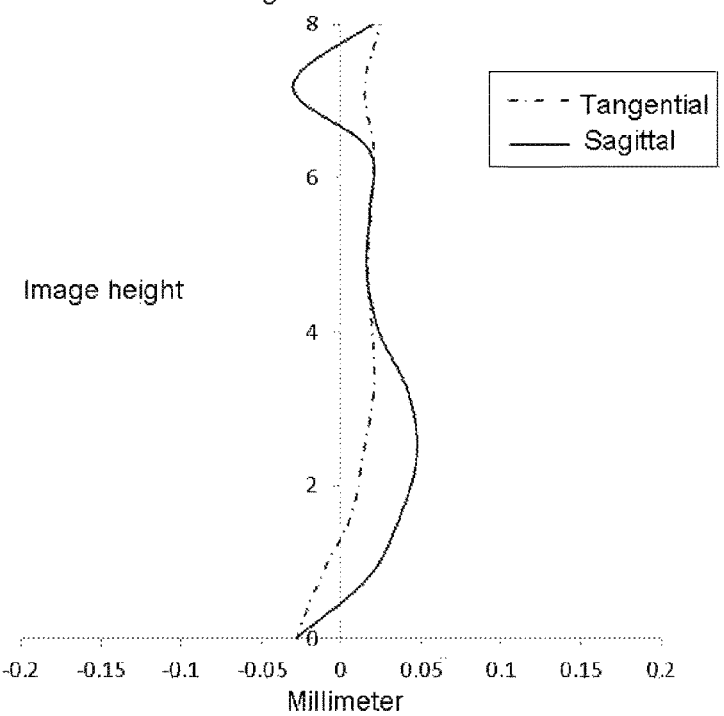
Figure 12C:
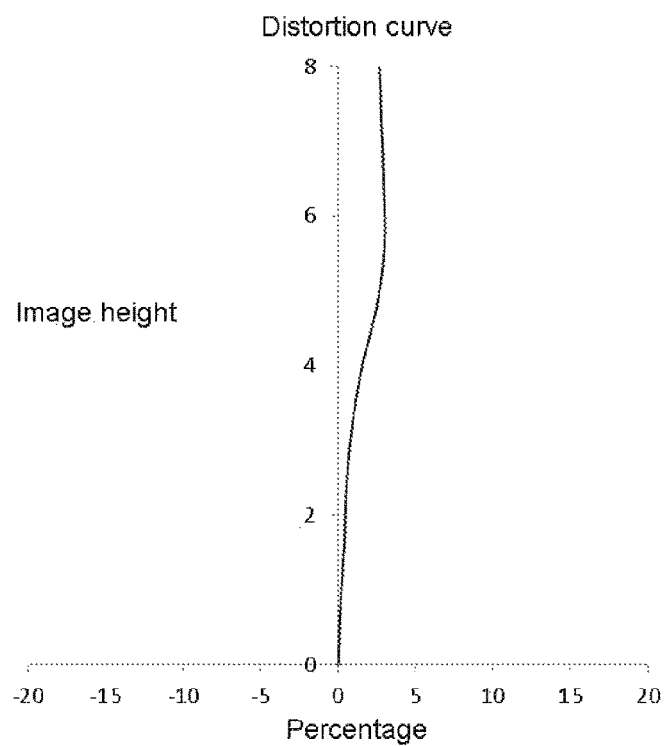
Figure 12D:
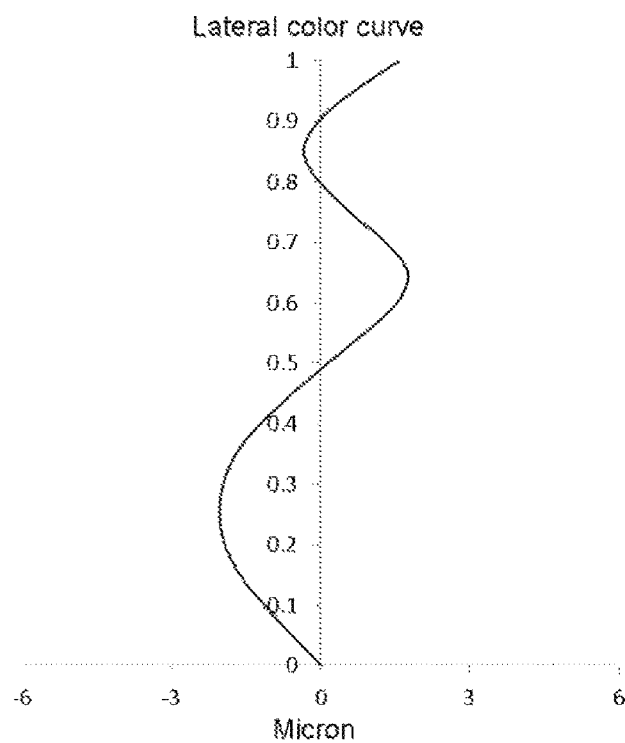

FIG. 12A shows a longitudinal aberration curve of the optical imaging lens according to embodiment 6 to represent deviation of a convergence focal point after light with different wavelengths passes through the lens. FIG. 12B shows an astigmatism curve of the optical imaging lens assembly according to embodiment 6 to represent a tangential image surface curvature and a sagittal image surface curvature. FIG. 12C shows a distortion curve of the optical imaging lens according to embodiment 6 to represent distortion values corresponding to different fields of view. FIG. 12D shows a lateral color curve of the optical imaging lens assembly according to embodiment 6 to represent deviation of different image heights on the imaging surface after the light passes through the lens assembly. According to FIGS. 12A to 12D, it can be seen that the optical imaging lens assembly provided in embodiment 6 may achieve high imaging quality.

From the above, embodiment 1 to embodiment 6 meet a relationship shown in Table 19 respectively.

TABLE 19

| Conditional expression | embodiment |||||| 
|---|---|---|---|---|---|---|
| | 1 | 2 | 3 | 4 | 5 | 6 |
| ImgH/T89 | 6.18 | 6.50 | 6.53 | 6.12 | 6.20 | 6.50 |
| f3/f2 | −2.58 | −2.37 | −2.18 | −2.44 | −2.53 | −2.38 |
| f5/f1 | 6.85 | 3.69 | 4.00 | 6.15 | 6.62 | 3.68 |
| f/(f8 + f9) | 1.17 | 1.44 | 1.36 | 1.18 | 1.10 | 1.49 |
| TTL/Fno | 4.76 | 4.72 | 4.70 | 4.77 | 4.80 | 4.72 |
| CT8/CT1 | 1.22 | 1.26 | 1.24 | 1.21 | 1.22 | 1.28 |
| Tan(HFOV)/CT9 | 1.29 | 1.23 | 1.25 | 1.27 | 1.26 | 1.22 |
| R1 × N1/R2 | 0.42 | 0.40 | 0.40 | 0.42 | 0.42 | 0.40 |
| R4/N2 | 3.06 | 2.99 | 3.06 | 3.05 | 3.04 | 2.98 |
| V2/R3 | 2.27 | 2.27 | 2.16 | 2.29 | 2.31 | 2.27 |
| f3/R6 | 3.64 | 2.94 | 2.54 | 3.42 | 3.58 | 2.94 |
| R14/V7 | −0.52 | −2.33 | −1.71 | −0.52 | −0.46 | −2.11 |

The disclosure also provides an imaging device, which is provided with an electronic photosensitive element for imaging. The electronic photosensitive element may be a Charge Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the above-mentioned optical imaging lens assembly.

The above description is only description about the preferred embodiments of the disclosure and adopted technical principles. It is understood by those skilled in the art that the scope of protection involved in the disclosure is not limited to the technical solutions formed by specifically combining the technical characteristics and should also cover other technical solutions formed by freely combining the technical characteristics or equivalent characteristics thereof without departing from the concept of the disclosure, for example, technical solutions formed by mutually replacing the characteristics and (but not limited to) the technical characteristics with similar functions disclosed in the disclosure.

What is claimed is:

1. An optical imaging lens assembly, sequentially comprising, from an object side to an image side along an optical axis, a first lens, a second lens, a third lens, a fourth lens, a fifth lens, a sixth lens, a seventh lens, an eighth lens and a ninth lens with refractive power respectively, wherein there is an air space between any two adjacent lenses;
the first lens has positive refractive power;
the second lens has negative refractive power;
the third lens has positive refractive power;
the fourth lens has negative refractive power, an object-side surface of the fourth lens is a concave surface, while an image-side surface of the fourth lens is a concave surface;
the fifth lens has positive refractive power;
the eighth lens has positive refractive power;
the ninth lens has negative refractive power; and
ImgH is a half of a diagonal length of an effective pixel region on an imaging surface, T89 is a spacing distance of the eighth lens and the ninth lens on the optical axis, ImgH and T89 meet $6.0<\text{ImgH}/T89<7.0$;
f is a total effective focal length of the optical imaging lens assembly, f8 is an effective focal length of the eighth lens, f9 is an effective focal length of the ninth lens, f and f8 and f9 meet:

$$1.0<f/(f8+f9)<1.5;$$

TTL is an on-axis distance from an object-side surface of the first lens to the imaging surface, Fno is an f-number of the optical imaging lens assembly, TTL and Fno meet:

$$4.5\text{ mm}<TTL/Fno<5.0\text{ mm};$$

CT1 is a center thickness of the first lens on the optical axis, CT8 is a center thickness of the eighth lens on the optical axis, CT1 and CT8 meet:

$$1.0<CT8/CT1<1.5.$$

2. The optical imaging lens assembly according to claim 1, wherein f2 is an effective focal length of the second lens, f3 is an effective focal length of the third lens, f2 and f3 meet:

$$-3.0<f3/f2<-2.0.$$

3. The optical imaging lens assembly according to claim 1, wherein f1 is an effective focal length of the first lens, f5 is an effective focal length of the fifth lens, f1 and f5 meet:

$$3.5<f5/f1<7.0.$$

4. The optical imaging lens assembly according to claim 1, wherein Semi-FOV is a half of a maximum field of view of the optical imaging lens assembly, CT9 is a center thickness of the ninth lens on the optical axis, Semi-FOV and CT9 meet:

$$1.0<\text{Tan}(\text{Semi-FOV})/CT9<1.5.$$

5. The optical imaging lens assembly according to claim 1, wherein T12 is a spacing distance of the first lens and the second lens on the optical axis, T23 is a spacing distance of the second lens and the third lens on the optical axis, T34 is a spacing distance of the third lens and the fourth lens on the optical axis, T12 and T23 and T34 meet:

$(T12+T23)<T34$.

6. The optical imaging lens assembly according to claim 1, wherein R1 is a curvature radius of the object-side surface of the first lens, R2 is a curvature radius of an image-side surface of the first lens, N1 is a refractive index of the first lens, R1 and R2 and N1 meet:

$R1 \times N1/R2<0.5$.

7. The optical imaging lens assembly according to claim 1, wherein R4 is a curvature radius of an image-side surface of the second lens, N2 is a refractive index of the second lens, R4 and N2 meet $2.5<R4/N2<3.5$.

8. The optical imaging lens assembly according to claim 1, wherein V2 is an Abbe number of the second lens, R3 is a curvature radius of an object-side surface of the second lens, V2 and R3 meet $2.0<V2/R3<2.5$.

9. The optical imaging lens assembly according to claim 1, wherein f3 is an effective focal length of the third lens, R6 is a curvature radius of an image-side surface of the third lens, f3 and R6 meet $2.5<f3/R6<4.0$.

10. The optical imaging lens assembly according to claim 1, wherein R14 is a curvature radius of an image-side surface of the seventh lens, V7 is an Abbe number of the seventh lens, R14 and V7 meet $-2.5<R14/V7<0$.

11. An optical imaging lens assembly, sequentially comprising, from an object side to an image side along an optical axis, a first lens, a second lens, a third lens, a fourth lens, a fifth lens, a sixth lens, a seventh lens, an eighth lens and a ninth lens with refractive power respectively, wherein there is an air space between any two adjacent lenses;
the first lens has positive refractive power;
the second lens has negative refractive power;
the third lens has positive refractive power,
the fourth lens has negative refractive power, an object-side surface of the fourth lens is a concave surface, while an image-side surface of the fourth lens is a concave surface;
the fifth lens has positive refractive power;
the eighth lens has positive refractive power;
the ninth lens has negative refractive power; and
f2 is an effective focal length of the second lens, f3 is an effective focal length of the third lens, f2 and f3 meet $-3.0<f3/f2<-2.0$;
f is a total effective focal length of the optical imaging lens assembly, f8 is an effective focal length of the eighth lens, f9 is an effective focal length of the ninth lens, f and f8 and f9 meet:

$1.0<f/(f8+f9)<1.5$;

TTL is an on-axis distance from an object-side surface of the first lens to the imaging surface, Fno is an f-number of the optical imaging lens assembly, TTL and Fno meet:

4.5 mm<TTL/Fno<5.0 mm;

CT1 is a center thickness of the first lens on the optical axis, CT8 is a center thickness of the eighth lens on the optical axis, CT1 and CT8 meet:

$1.0<CT8/CT1<1.5$.

12. The optical imaging lens assembly according to claim 11, wherein f1 is an effective focal length of the first lens, f5 is an effective focal length of the fifth lens, f1 and f5 meet $3.5<f5/f1<7.0$.

13. The optical imaging lens assembly according to claim 12, wherein ImgH is a half of a diagonal length of an effective pixel region on an imaging surface, T89 is a spacing distance of the eighth lens and the ninth lens on the optical axis, ImgH and T89 meet $6.0<ImgH/T89<7.0$.

14. The optical imaging lens assembly according to claim 11, wherein Semi-FOV is a half of a maximum field of view of the optical imaging lens assembly, CT9 is a center thickness of the ninth lens on the optical axis, Semi-FOV and CT9 may meet $1.0<Tan (Semi-FOV)/CT9<1.5$.

* * * * *